(12) United States Patent
Ishikawa et al.

(10) Patent No.: US 6,204,949 B1
(45) Date of Patent: Mar. 20, 2001

(54) METHOD AND DEVICE FOR EXTRACTING A TIMING SIGNAL

(75) Inventors: George Ishikawa; Hiroki Ooi; Takeshi Ihara, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/057,597

(22) Filed: Apr. 9, 1998

(30) Foreign Application Priority Data

Sep. 11, 1997 (JP) .................................................... 9-247086

(51) Int. Cl.[7] ...................................................... H04B 10/00
(52) U.S. Cl. ........................ 359/161; 359/158; 359/135; 375/327
(58) Field of Search ...................................... 359/135, 158, 359/161, 110; 375/327, 376

(56) References Cited

U.S. PATENT DOCUMENTS

| 5,706,113 | * | 1/1998 | Kawanishi et al. | 359/158 |
| 5,815,294 | * | 9/1998 | Ishikawa et al. | 359/110 |
| 5,877,881 |   | 3/1999 | Miyauchi et al. . | |

FOREIGN PATENT DOCUMENTS

| 6-216467 | 8/1994 | (JP) . |
| 7-327012 | 12/1995 | (JP) . |
| 8-256106 | 10/1996 | (JP) . |

OTHER PUBLICATIONS

M.M. Ohn, A.T. Alavie, R. Maaskant, M.G. Xu, F. Bilodeau, K.O. Hill, "Tunable fiber grating dispersion using a piezoelectric stack", OFC '97 Technical Digest, WJ3, pp. 155–156.

Sergio Barcelos, Michael N. Zervas, Richard I. Laming, "Characteristics of chirped fiber grating for dispersion compensation", OFC '96 Technical Digest, WK12, pp. 161–162.

Koichi Takiguchi, Katsunari Okamoto, "Variable Group–Delay Dispersion Equalizer Using Lattice–Form Programmable Optical Filter on Planar Lightwave Circuit", IEEE J. Selected Topics in Quantum Electronics, Jun. 2, 1996, pp. 270–276.

Akihide Sano et al., "Automatic dispersion equalization by monitoring extracted–clock power lever in a 40–Gbit/s, 200 km transmission line", ECOC '96, TuD.3.5, 1996, pp. 207–210.

* cited by examiner

Primary Examiner—Kinfe-Michael Negash
(74) Attorney, Agent, or Firm—Staas & Halsey LLP

(57) ABSTRACT

A method for extracting a timing signal produces a data signal from a first portion of an optical signal, extracts a timing signal from a second portion of the optical signal and adds dispersion compensation to at least one of the first and second portions of the optical signal to thereby control the amount of total dispersion in the second portion of the optical signal to be substantially different from the amount of total dispersion in the first portion of the optical signal. The timing signal extracting device uses a signal reproduction circuit to produce the data signal, a signal extraction circuit to extract the timing signal and a chromatic dispersion control apparatus to add dispersion compensation. The optical signal may be modulated by a data signal having a bit rate of X bits/second and the extracted timing signal may have a frequency of X hertz. The signal extraction circuit may be used with a phase locked loop. Here, a voltage-controlled oscillator generates a clock signal, a phase comparison circuit compares the phase of the clock signal with the phase of the extracted timing signal and a control circuit controls the phase comparison circuit, to generate a control voltage for the voltage-controlled oscillator on the basis of the comparison. The chromatic dispersion control apparatus may use a variable dispersion compensator together with an optical detector which detects the intensity of a specific frequency component of the optical signal to minimize the intensity of the specific frequency component.

45 Claims, 25 Drawing Sheets

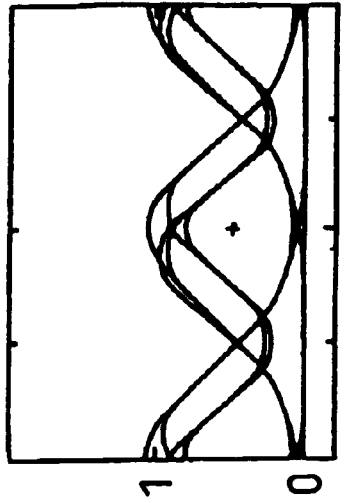
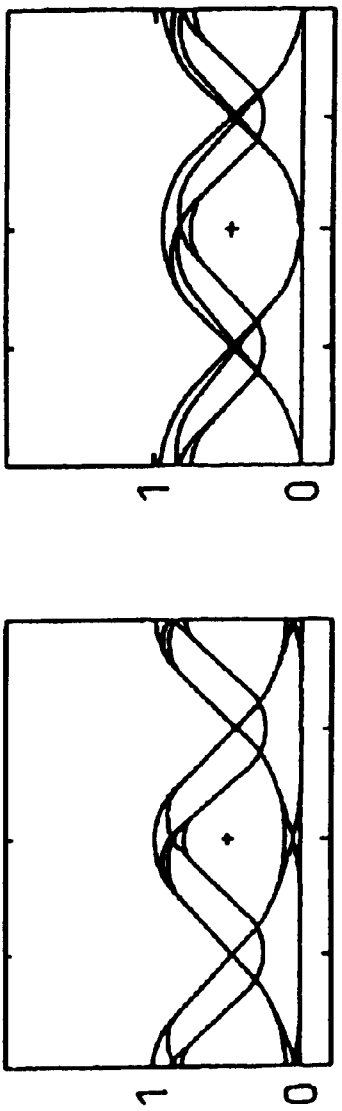
FIG. 7A  −40ps/nm
FIG. 7B  0ps/nm
FIG. 7C  +40ps/nm
OTDM NRZ
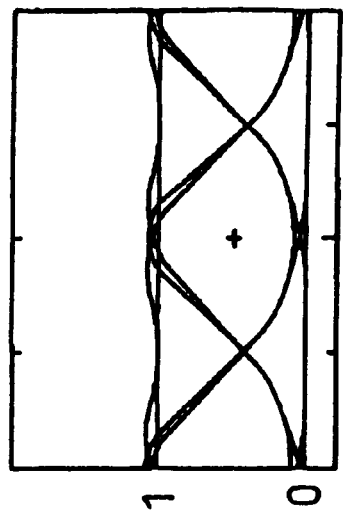
FIG. 8C +40ps/nm
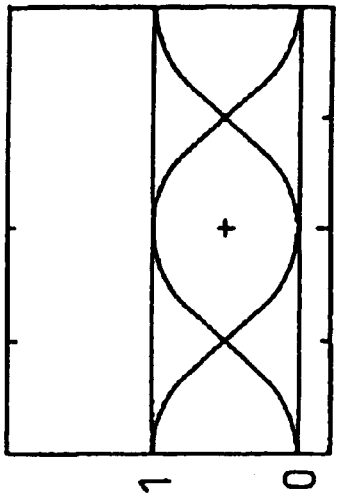
FIG. 8B 0ps/nm
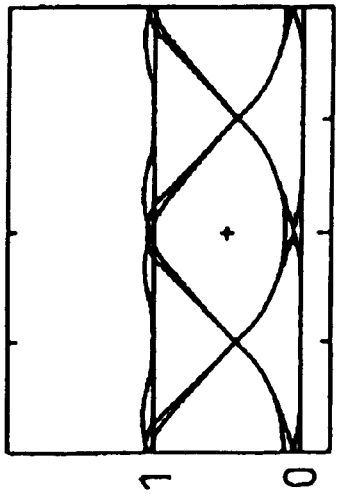
FIG. 8A −40ps/nm

METHOD AND DEVICE FOR EXTRACTING A TIMING SIGNAL

BACKGROUND OF THE INVENTION

1. Field of the Invention

The present invention relates in general to reproducing an electronic data signal from a received optical signal and more specifically to a method and device for extracting from the received optical signal, a timing signal for providing timing to the electric data signal reproduced from the received optical signal.

2. Description of the Related Art

Optical transmission systems with data rates of 10 Gb/s have been implemented in trunk-line optical communications. However, with rapid increases in the amount of information to be transmitted in recent years, in part resulting from the Internet, a further increase in transmission capacity is demanded. One way to achieve this is to increase transmission speeds using time-division multiplexing (including optical time-division multiplexing OTDM). Research and development for the next generation of transmission system, a 40-Gb/s system, is being carried out vigorously throughout the world. The present invention is especially for use with this next generation system.

Generally, the following two timing extraction methods have been practiced in prior known optical transmission systems to generate a clock signal from an optical signal, which clock signal has a frequency, X-GHz, nominally the same as the data transmission rate, X-Gb/s, of the optical signal.

(i) A phase locked loop (PLL) method is used when the X-GHz clock signal component is contained in the baseband spectrum of the received optical signal, such as in the case of a return-to-zero (RZ) coded signal. With the PLL method, the optical signal is first converted into an electrical signal, and then the X-GHz timing signal is extracted directly by using a band-pass filter. A voltage-controlled oscillator (VCO) outputs a clock signal. The X-GHz timing signal is phase-compared with the output of the VCO (the clock signal) for correction. Thereby, the clock signal is synchronized to the received optical signal and is generated as the output of the VCO.

(ii) A non-linear extraction method is used when the X-GHz clock component is not contained in the baseband spectrum of the received optical signal. For example, the nonlinear extraction method may be used in the case of a non-return-to-zero (NRZ) coded signal. According to the non-linear extraction method, the optical signal is first converted into an electrical signal which is then divided between two paths. The signal transmitted through one of the two paths is delayed a time equal to one-half of a one symbol period (1/40-GHz=25 ps) and then multiplied by two by introducing the signals from the two paths into an EXOR circuit. After this, the X-GHz timing signal is extracted using a band-pass filter.

In Japanese Patent Application No. 9-224056, two of the present inventors pointed out that precise dispersion compensation is essential for an ultra high-speed transmission system of 40-Gb/s or higher. As a means to achieve that end, the present inventor proposed that a timing signal component whose frequency is equal in value to the bit rate of the optical signal be extracted from the received optical signal, and that the amount of total dispersion of the optical transmission line be set so that the intensity of the timing signal frequency component becomes a maximum or a minimum.

In the case of an RZ signal, since the baseband spectrum contains a component having a frequency equal in value to the bit rate, the amount of total dispersion amount can be optimized as above using PLL (method (i)). That is, the above total dispersion optimization technique maximizes the intensity of the 40-GHz (data rate) component, and therefore the PLL method (method (i)) can be applied directly.

A 40-Gb/s OTDM signal is formed by multiplexing two optical signals modulated with two 20-GHz RZ signals opposite in phase with their tails overlapping each other with the phases of their light waves shifted 180° relative to each other so as to cancel out the overlapping portions. In this case too, the 40-GHz component is contained in the baseband spectrum. Accordingly, the total dispersion amount can be optimized using method (i). That is, in the case of the OTDM signal, when the above total dispersion optimization technique is applied, the amount of total dispersion is set to minimize intensity of the 40-GHz component. However, because the intensity of the 40-GHz component does not become zero at the minimum point, method (i) can be used to generate a timing signal from the optical signal whose chromatic dispersion has been optimized by the above technique.

In the case of a non-return-to-zero (NRZ) coded signal, on the other hand, a frequency component equal in value to the signal bit rate does not exist in the baseband spectrum because of its principle of operation. Accordingly, method (i) cannot be applied, and usually the nonlinear extraction method (method of (ii)) is used. More specifically, if the above total dispersion amount optimization technique is applied to a 40-Gb/s NRZ system, the amount of total dispersion minimizes the 40-GHz frequency component, and because of its principle of operation, the intensity of the 40-GHz component becomes zero at the minimum point. Because the 40-GHz component cannot be extracted using method (i), it has been proposed to use method (ii). However, to apply method (ii) to a 40-Gb/s system requires an electronic circuit operating at 80-Gb/s, i.e., a speed two times the bit rate. This 80-Gb/s signal is to be provided at the output stage of an EXOR circuit. Circuits operating at 80-Gb/s are difficult to implement using present integrated circuit technology.

SUMMARY OF THE INVENTION

It is accordingly an object of the present invention to provide a method and device for generating a clock signal by extracting a frequency component from a received optical signal. The extracted frequency component is to have a frequency equal in value to the bit rate of the received optical signal. At the same time the frequency component is extracted, the amount of total dispersion in the optical transmission line for signal reproduction is optimized. It is an object to provide a method and device that can do the foregoing even for an ultra high-speed optical signal transmitting at about 40-Gb/s and not containing a frequency component equal in value to the bit rate because of its principle of operation.

These and other objects are achieved by providing a method for extracting a timing signal produces a data signal from a first portion of an optical signal, extracts a timing signal from a second portion of the optical signal and adds dispersion compensation to at least one of the first and second portions of the optical signal to thereby control the amount of total dispersion in the second portion of the optical signal to be substantially different from the amount of total dispersion in the first portion of the optical signal.

The timing signal extracting device uses a signal reproduction circuit to produce the data signal, a signal extraction circuit to extract the timing signal and a chromatic dispersion control apparatus to add dispersion compensation. The optical signal may be modulated by a data signal having a bit rate of X bits/second and the extracted timing signal may have a frequency of X hertz. The signal extraction circuit may be used with a phase locked loop. Here, a voltage-controlled oscillator generates a clock signal, a phase comparison circuit compares the phase of the clock signal with the phase of the extracted timing signal and a control circuit controls the phase comparison circuit, to generate a control voltage for the voltage-controlled oscillator on the basis of the comparison. The chromatic dispersion control apparatus may use a variable dispersion compensator together with an optical detector which detects the intensity of a specific frequency component of the optical signal to minimize the intensity of the specific frequency component.

BRIEF DESCRIPTION OF THE DRAWING

The invention will be readily understood by reference to the following description of specific embodiments described by way of example only, with reference to the accompanying drawings in which like reference characters represent like elements, wherein:

FIGS. 7A, 7B and 7C show waveform diagrams of the OTDM signal after being subjected to −40 ps/nm, 0 ps/nm and +40 ps/nm chromatic dispersion, respectively;

FIGS. 8A, 8B and 8C show waveform diagrams of the NRZ signal after being subjected to −40 ps/nm, 0 ps/nm and +40 ps/nm chromatic dispersion, respectively;

DETAILED DESCRIPTION OF THE PREFERRED EMBODIMENTS

FIGS. 1 to 4 show computer simulation results of the dependence of the intensity of a 40-GHz component on total dispersion. The intensity of the 40-GHz component in the baseband spectrum is shown for an OTDM signal (a signal made by multiplexing two optical signals modulated with two 20-GHz RZ signals opposite in phase with their tails overlapping each other with the phases of their light waves shifted 180° relative to each other so as to cancel out the overlapping portions), an NRZ optical signal, an RZ optical signal (50% duty), and an RZ optical signal (25% duty), respectively, each with a data signal bit rate of 40-GHz. The eye opening amplitude is also shown in FIGS. 1 to 4. The wavelength of input light was 1.55 µm, the power was −5 dBm on the average, the zero dispersion wavelength of the single-mode fiber (SMF) used was 1.3 µm, and the SMF length was 50 km; with these conditions, the amount of total dispersion was varied by varying the amount of dispersion in a DCF (dispersion-compensating fiber) connected in series with the SMF.

As can be seen from FIGS. 1 to 4, when the amount of total dispersion is set so that the intensity of the 40-GHz component is at a minimum in the case of the OTDM signal and at a maximum in the case of the RZ signals, the amount of total dispersion is approximately zero at the minimum or maximum. In either case, since the intensity of the 40-GHz Ad component is not zero, the 40-GHz component can be extracted directly. In the case of the NRZ signal, on the other hand, if the amount of total dispersion is set in a similar manner, the intensity of the 40-GHz component becomes zero and the 40-GHz component cannot be extracted directly.

Figure 1:
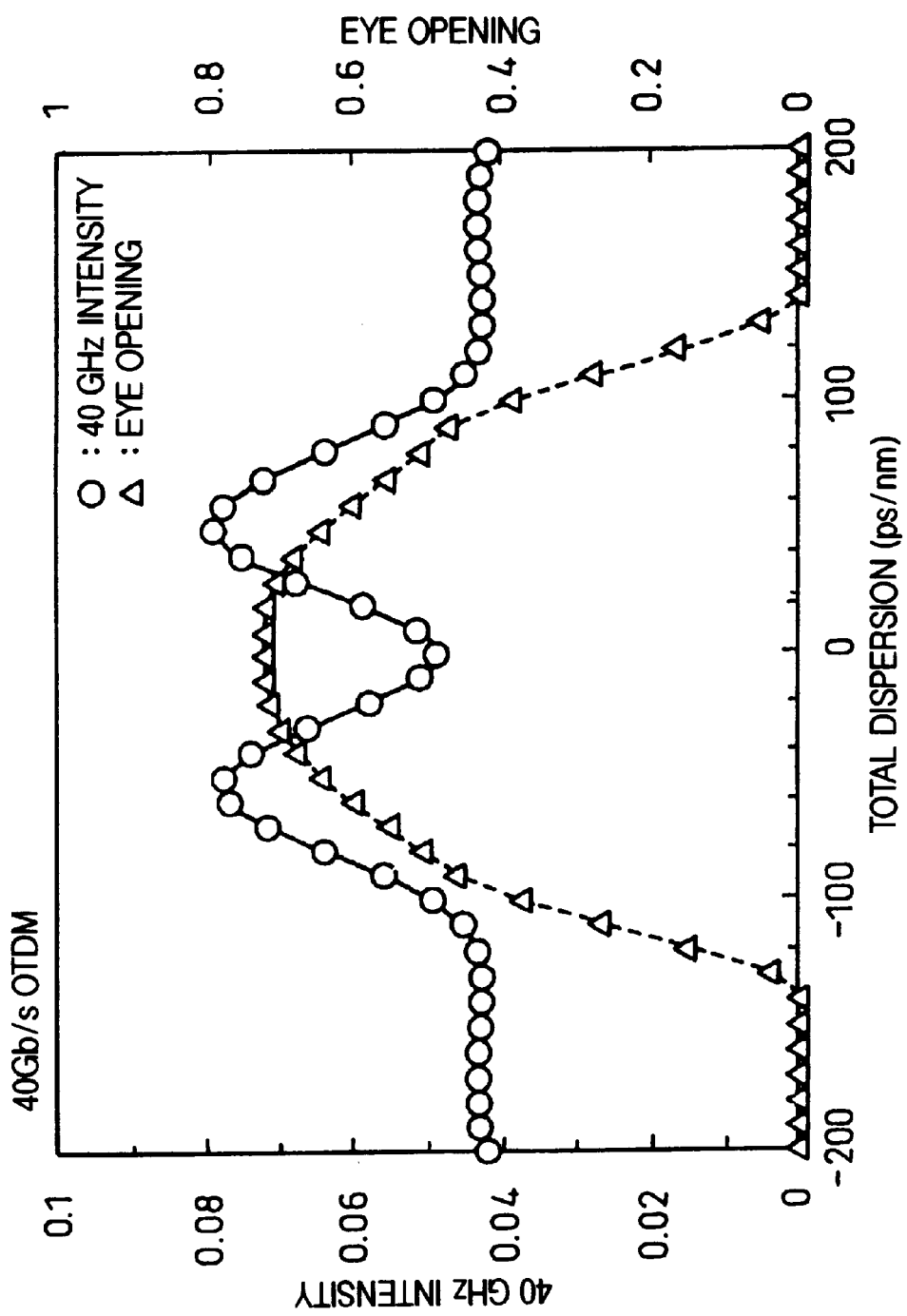
FIG. 1 is a graph showing a computer simulation of the dependence of the intensity of a 40-GHz clock component on the amount of total dispersion in a 40-Gb/s OTDM signal.
Figure 2:
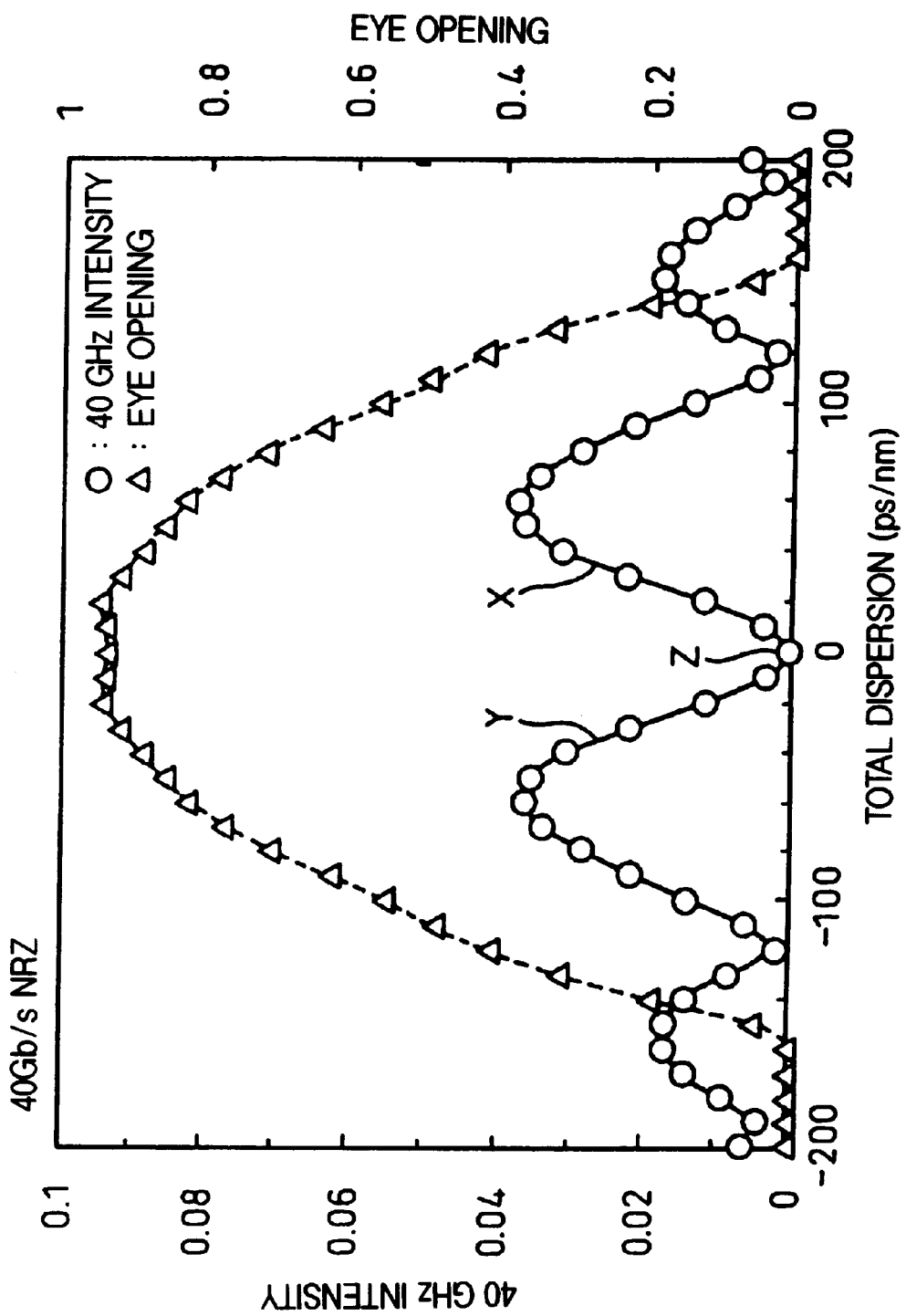
FIG. 2 is a graph showing a computer simulation of the dependence of the intensity of a 40-GHz clock component on the amount of total dispersion in a 40-Gb/s NRZ signal.
Figure 3:
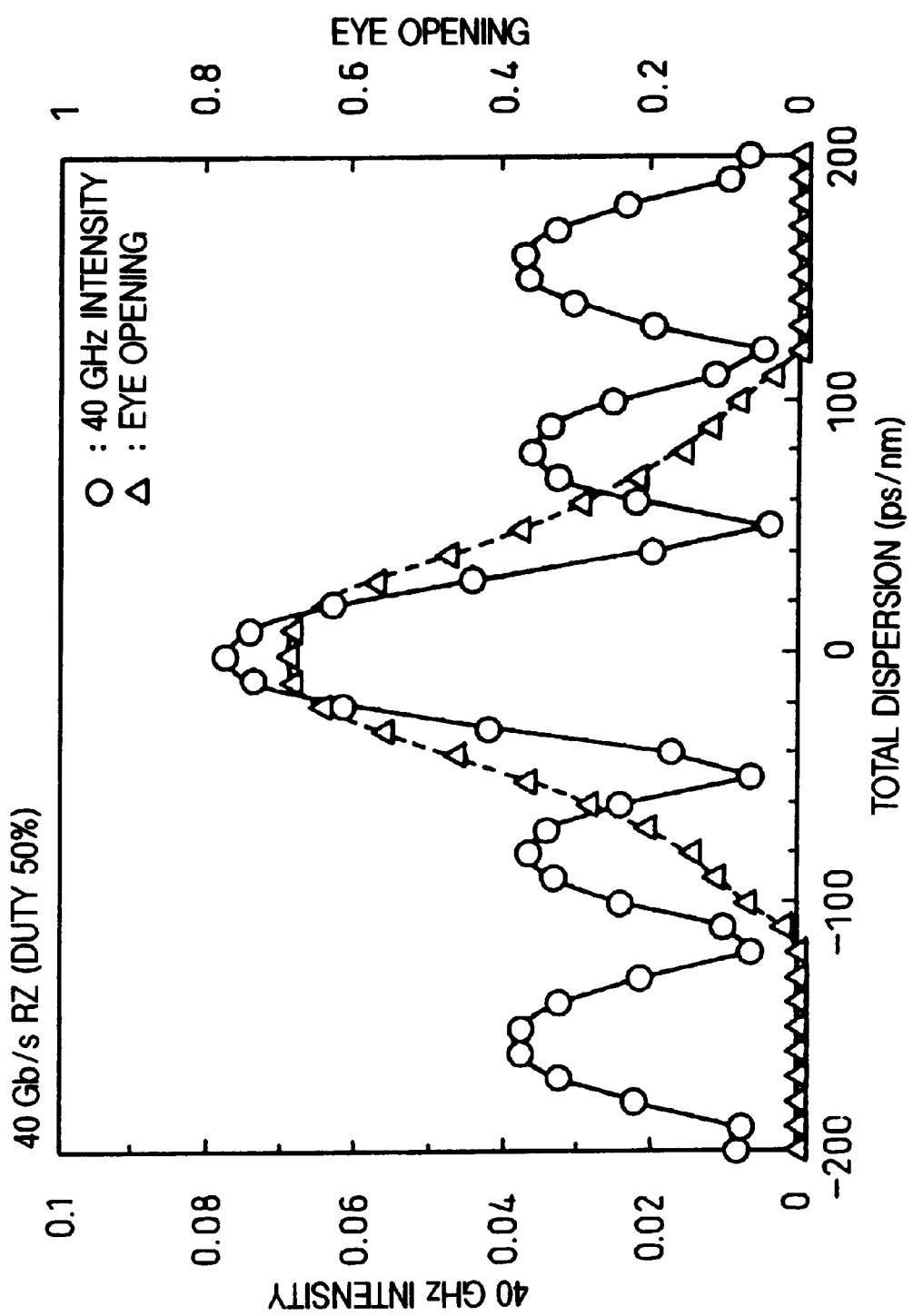
FIG. 3 is a graph showing a computer simulation of the dependence of the intensity of a 40-GHz clock component on the amount of total dispersion in a 40-Gb/s RZ signal (50% duty)
Figure 4:
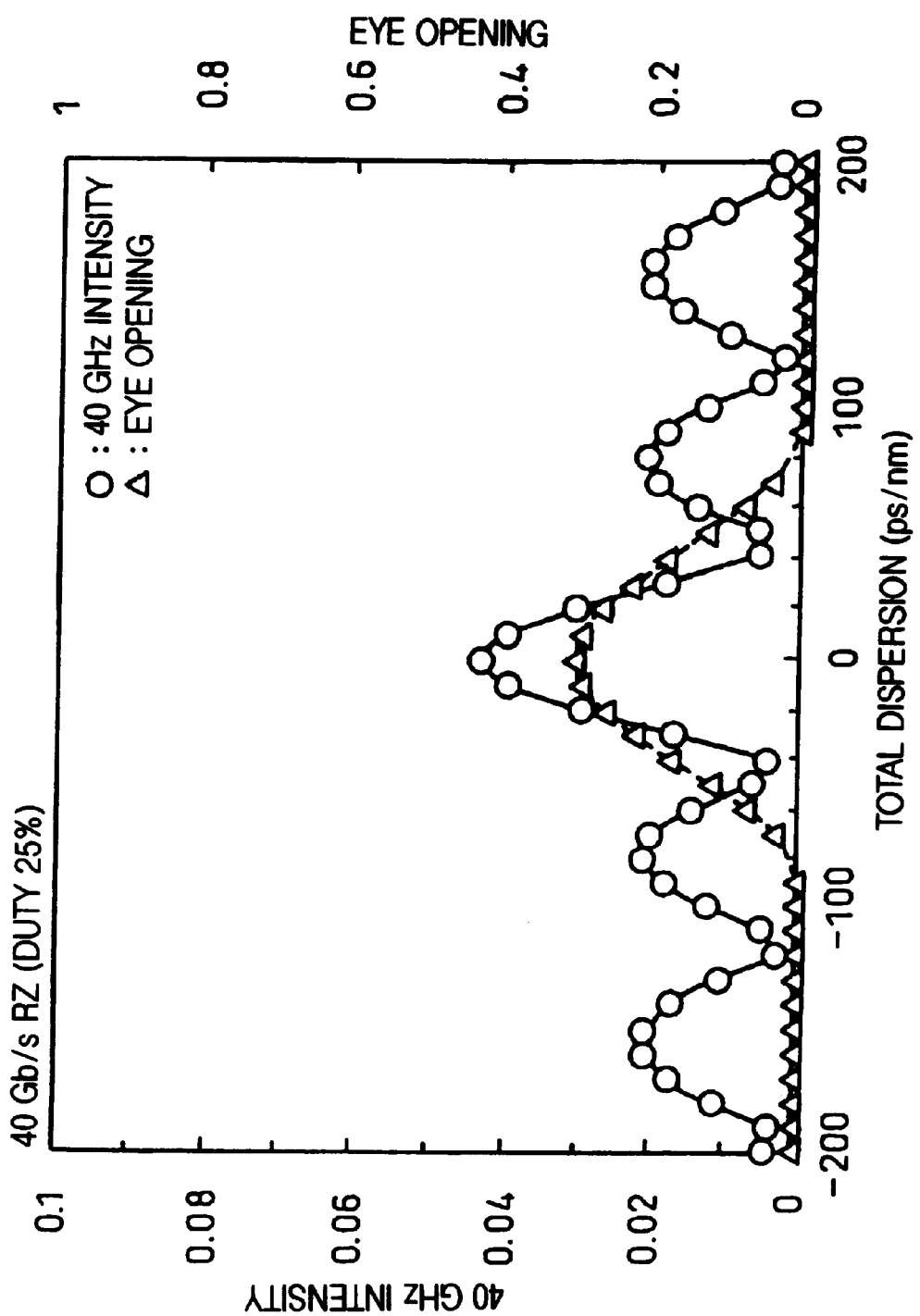
FIG. 4 is a graph showing a computer simulation of the dependence of the intensity of a 40-GHz clock component on the amount of total dispersion in a 40-Gb/s RZ signal (25% duty)

However, as can be seen from FIG. 2, in the case of the NRZ signal, there are two maxima where there is an appreciable 40-GHz frequency component. These maxima occur when the amount of total dispersion is about ±60 ps/nm. Noting this, signal reproduction according to the present invention minimizes the amount of total dispersion in the eye opening. However, for timing signal generation, the amount of total dispersion should be substantially different from the above minimum, and this maximizes the intensity of the timing signal component so that the timing signal component can be extracted directly.

Figure 5:
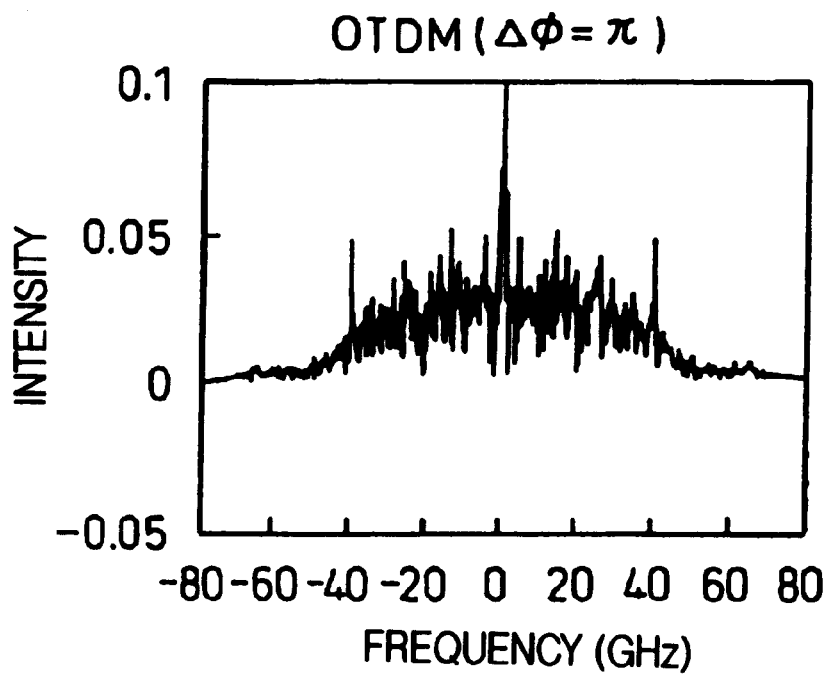
FIG. 5 is a graph showing a baseband spectrum of the OTDM signal.
Figure 6:
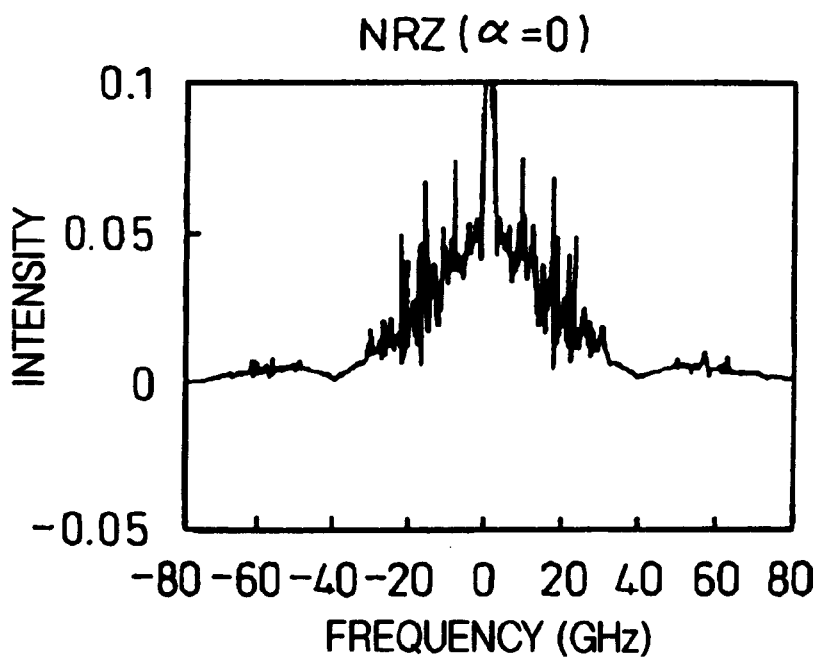
FIG. 6 is a graph showing a baseband spectrum of the NRZ signal.

For reference purposes, the baseband spectra of optical modulated signals are shown, in FIGS. 5 and 6, for 40 Gb/s OTDM and NRZ signals, respectively. In the case of NRZ, there is no 40-GHz component. However it is presumed from a qualitative point of view that the 40-GHz component exists after chromatic dispersion because of spectral spreading. FIGS. 7A, 7B and 7C show waveform diagrams of the OTDM signal after being subjected to −40 ps/nm, 0 ps/nm and +40 ps/nm chromatic dispersion, respectively. FIGS. 8A, 8B and 8C show waveform diagrams of the NRZ signal after being subjected to −40 ps/nm, 0 ps/nm and +40 ps/nm chromatic dispersion, respectively. As shown, for both OTDM and NRZ, after dispersion (positive and negative) the 1 level at the center of the waveform rises but the cross points lower. From this it can be seen that there is a variation in intensity with a cycle equal to the length of one time slot. The variation in intensity creates the 40-GHz component.

Figure 9:
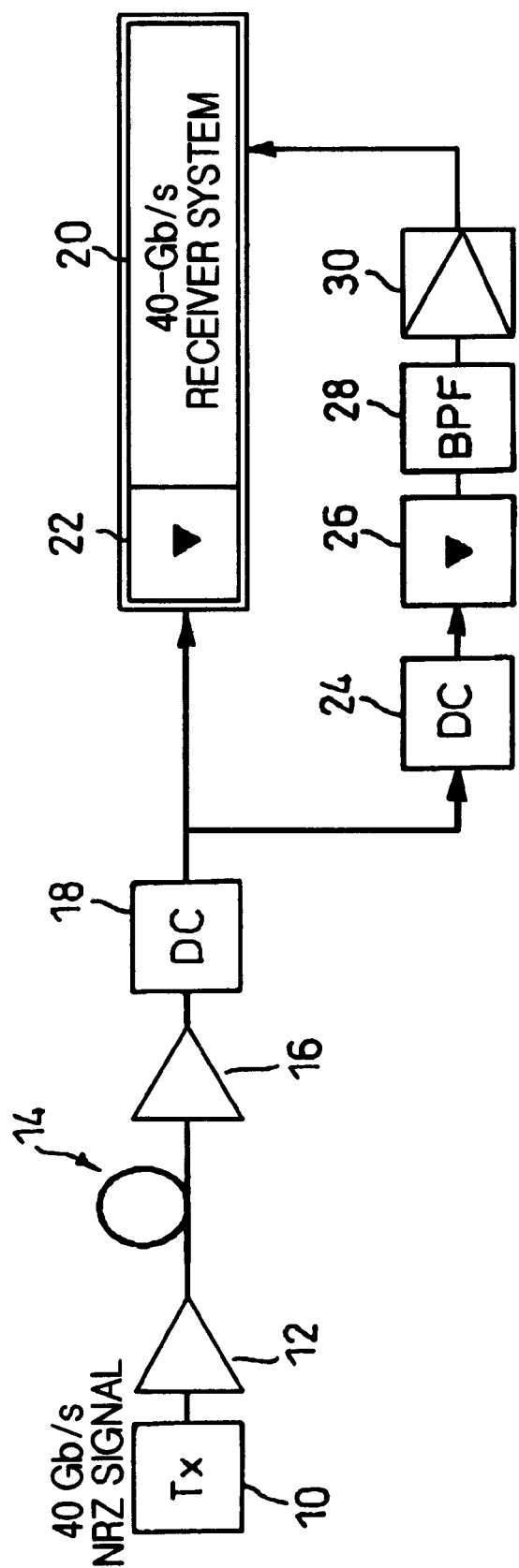
FIG. 9 is a block diagram of an optical transmission system according to a first preferred embodiment of the present invention.

FIG. 9 shows an optical transmission system equipped with a signal extraction circuit according to a first preferred embodiment of the present invention. In FIG. 9, a 40-Gb/s NRZ optical signal output from an optical transmitter 10 is amplified by an optical post-amplifier 12 and transmitted through an optical transmission line (optical fiber) 14. At the receiving end, the received optical signal is amplified by an optical preamplifier 16 and input via a dispersion compensator 18 into a photodiode 22 in a 40-Gb/s receiver system 20.

A portion of the optical signal directed to the photodiode 22 is separated by an optical coupler (not shown) and input into a photodiode 26 via a dispersion compensator 24. The 40-GHz component contained in the electrical signal output from the photodiode 26 is extracted by a narrowband band-pass filter 28, amplified by an amplifier 30, and supplied to the 40-Gb/s receiver system 20 as an extracted timing signal for data discrimination, etc.

Here, the dispersion compensator 18 has a dispersion value that reduces the total dispersion of the optical signal incident on the photodiode 22 to zero. The dispersion compensator 24 has a dispersion value of +60 ps/nm or −60 ps/nm. In this way, the eye opening of the input signal to the 40-Gb/s receiver system 20 is maximized. At the same time the 40-GHz frequency component is maximized for extraction by the narrowband band-pass filter 28.

Here, the dispersion compensator 18 may be omitted when the signal light wavelength is substantially equal to the zero dispersion wavelength of the optical fiber 14 and the eye opening of the input signal to the 40-Gb/s receiver system 20 is therefore sufficiently large even without the dispersion compensator 18. Also, the dispersion compensators 18 and 24 need not necessarily have fixed dispersion values, but may be constructed as variable dispersion compensators having semi-fixed dispersion values that can be changed according to an external signal. Further, in the case of an OTDM signal, which does not experience the zero intensity problems of an NRZ signal, if two different dispersion values are used, one for maximizing the eye opening of the signal incident on the photodiode 22 (bringing the 40-GHz component to a minimum) and the other for bringing the 40-GHz component of the optical signal incident on the photodiode 26 to a maximum, the accuracy of the extracted clock signal is enhanced compared with the case in which the 40-GHz component is minimized for both photodiode 22 and photodiode 26.

Figure 10:
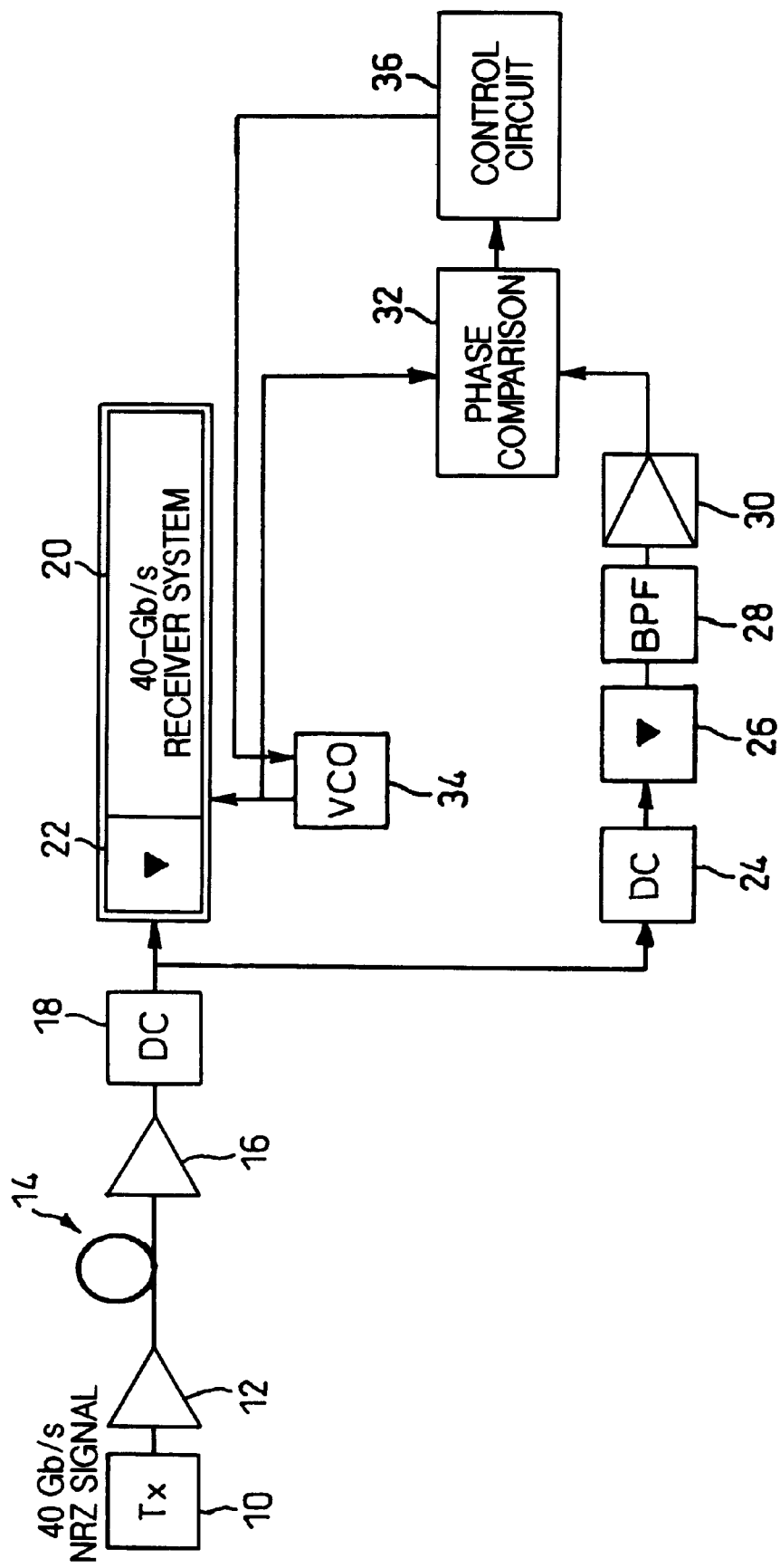
FIG. 10 is a block diagram of an optical transmission system according to a second preferred embodiment of the present invention.

FIG. 10 shows a second preferred embodiment of the present invention. In this embodiment, the extracted 40-GHz component is not supplied directly to the 40-Gb/s receiver system 20. Instead, a voltage-controlled oscillator (VCO) 34 supplies a clock signal to the 40-Gb/s receiver system. To do this, the extracted 40-GHz timing signal and the clock signal output of VCO 34 are supplied to a phase comparator 32. Phase comparator 32 compares the phase of the extracted timing signal with that of the output of VCO 34. In accordance with the result of the comparison, a control circuit 36 supplies a control voltage to the VCO 34 which thus generates the clock signal synchronized with the extracted 40-GHz component. The clock signal is supplied to the 40-Gb/s receiver system 20. These additional components serve to eliminate the jitter and distortion in the signal supplied to receiver system 20.

Figure 11:
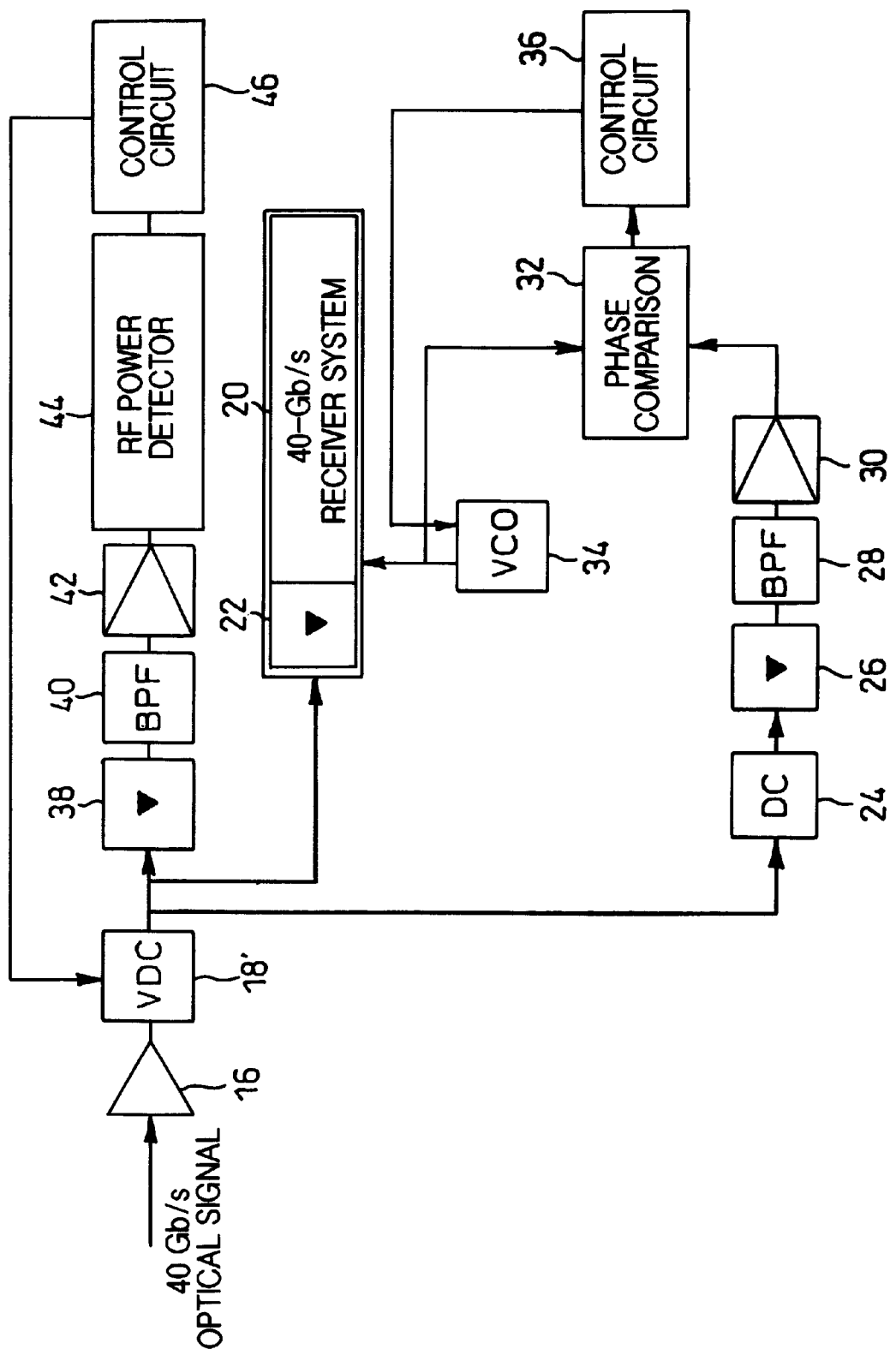
FIG. 11 is a block diagram of an optical transmission system according to a third preferred embodiment of the present invention.

FIG. 11 shows a third preferred embodiment of the present invention. In this embodiment, a variable dispersion compensator 18' is used instead of the dispersion compensator 18 having a fixed or semi-fixed dispersion value. A portion of the optical signal directed to the photodiode 22 is separated by another optical coupler (not shown), supplied to photodiode 38 and converted by photodiode 38 into an electrical signal. A 40-GHz component is extracted by a band-pass filter 40 from the output of the photodiode 38. The 40-GHz component is amplified by an amplifier 42, and the power thereof is detected by a detector 44. Based on the value of the detected power, a control circuit 46 controls the amount of dispersion in the variable dispersion compensator 18' so as to minimize the power.

Next, one example of the variable dispersion compensator 18' (M. M. Ohn et al., "Tunable fiber grating dispersion using a piezoelectric stack," OFC '97 Technical Digest, WJ3, pp. 155–156) will be described.

Figure 12:
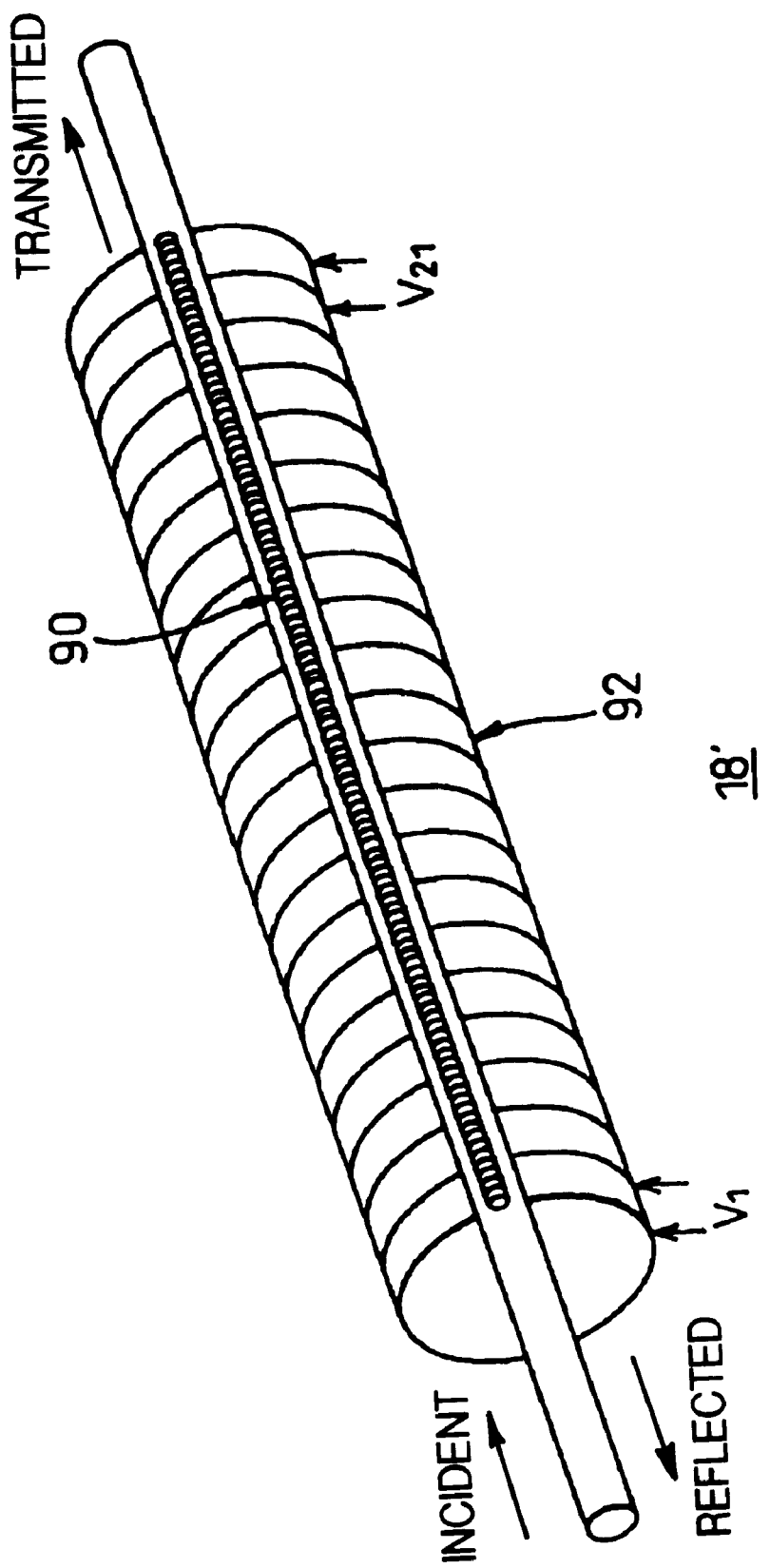
FIG. 12 is a perspective view of a variable dispersion compensator that can be used in the optical transmission system shown in FIG. 11.
Figure 13:
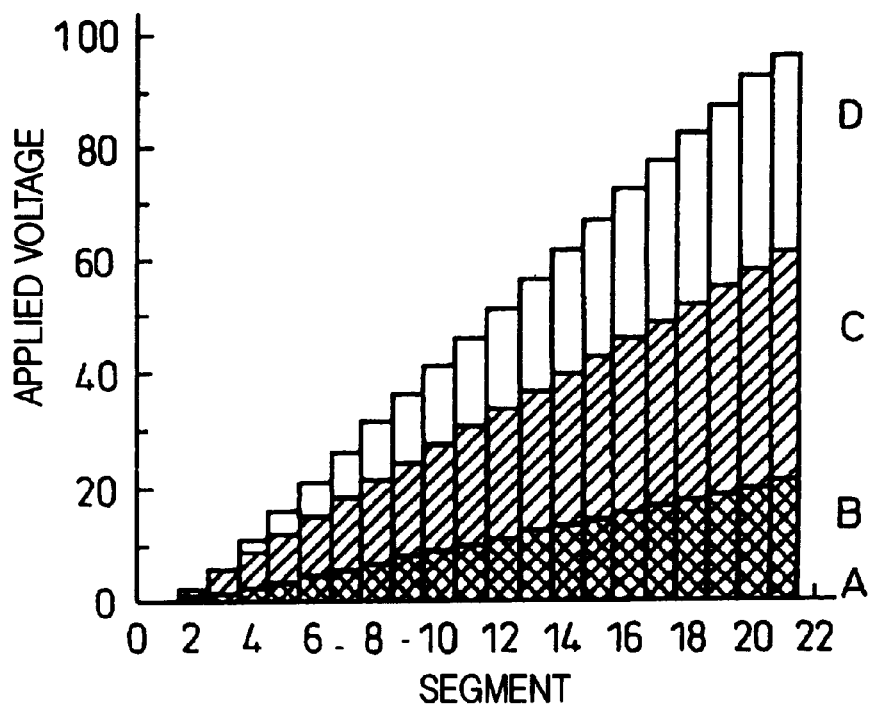
FIG. 13 is a graph showing patterns A to D of voltages $V_1$ to $V_{21}$, applied to segments of the variable dispersion compensator shown in FIG. 12.

As shown in FIG. 12, a piezoelectric element 92 is attached to each of 21 segments of a chirped fiber grating 90. When voltages $V_1$ to $V_{21}$, with a gradient as shown in FIG. 13, are applied to the piezoelectric elements 92, the pressure being applied in the longitudinal direction of the grating 90 changes. Voltages $V_1$ to $V_{21}$ are applied in accordance with the =0 voltage patterns A to D shown in FIG. 13. Voltage patterns A to D produce the dispersion values (slopes of the lines) shown in FIG. 14. Dispersion values between those shown in FIG. 14 can be obtained for the transmission system shown in FIG. 11 by using voltage patterns between those shown in FIG. 13.

Figure 15:
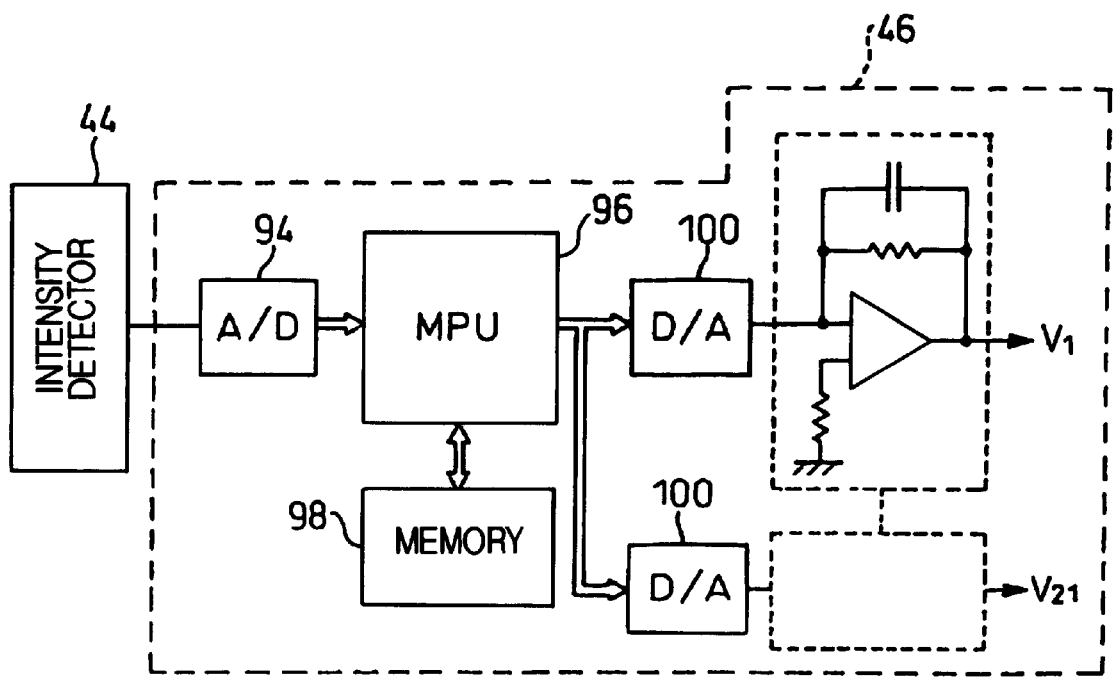
FIG. 15 is a block diagram showing a control circuit 46 that can be used in the transmission system shown in FIG. 11.

FIG. 15 is a diagram showing one example of the control circuit 46 which could be used in the transmission system shown in FIG. 11. The intensity value of the 40-Gb/s frequency component is A/D converted by an A/D converter 94 and input as a digital signal to a microprocessor unit (MPU 96). The MPU 96 compares the present intensity value Ic with the previously received intensity value Ip stored in a memory 98, and checks to determine whether the relationship between the present dispersion amount and the intensity of the 40-Gb/s is on the X sloped portion or Y sloped portion of the intensity curve shown in FIG. 2. That is, when it is on the X sloped portion (increasing intensity), the amount of dispersion will tend to zero (Z point) if the dispersion amount of the variable dispersion compensator 34 is reduced. When it is on the Y sloped portion (decreasing intensity), the amount of dispersion will tend to zero if the dispersion amount of the variable dispersion compensator 18' is increased. When Ic) Ip, it is assumed that the relationship is on the X sloped portion, and the voltages $V_1$ to $V_{21}$ applied to the variable dispersion compensator 18' are controlled to decrease the dispersion amount. The voltages to be applied to the respective piezoelectric elements are each output via a digital to analog converter (D/A 100) having a latch. Conversely, when Ic (Ip, it is assumed that the relationship is on the Y sloped portion, and the voltages $V_1$ to $V_{21}$ are controlled to increase the dispersion amount of the variable dispersion compensator 18'.

Figure 14:
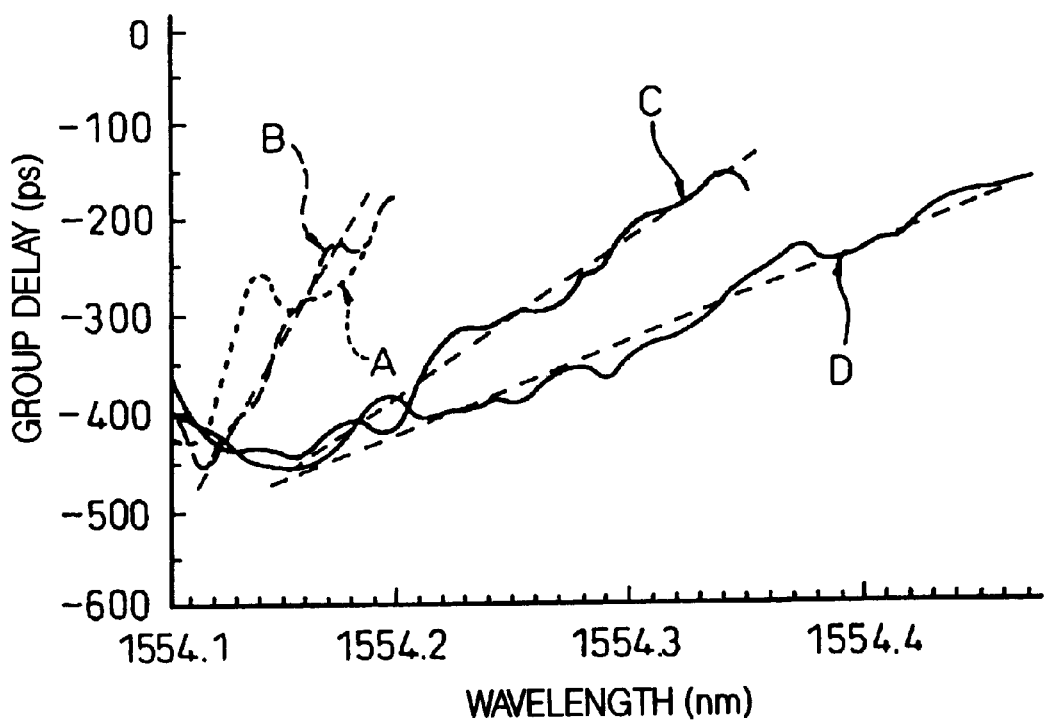
FIG. 14 is a graph showing dispersion values resulting from the voltage patterns A to D shown in FIG. 13.

Here, to set the values of $V_1$ to $V_{21}$, the data shown in FIGS. 13 and 14 (the data representing the relationship between the dispersion amount and $V_1$ to $V_{21}$) and the data shown in FIG. 2 (the data representing the relationship between the intensity of the 40-GHz component and the amount of total dispersion) are stored in memory 98 in advance. Then, it is determined whether the relationship is on the X sloped portion or the Y sloped portion in FIG. 2, and the present dispersion amount $D_c$ is obtained from the data shown in FIG. 2. Next, the dispersion amount $D_c'$ necessary in the variable dispersion compensator 18' to reduce the amount of dispersion to zero at Z point is determined from the present dispersion amount $D_c$. That is, $D_c'$ is determined so that $D_c+D_c'=0$.

Once $D_c'$ is determined in this way, the voltages $V_1$ to $V_{21}$, to be applied to the variable dispersion compensator 18' in order to obtain $D_c'$ are determined based on the data shown in FIGS. 13 and 14.

Figure 16:
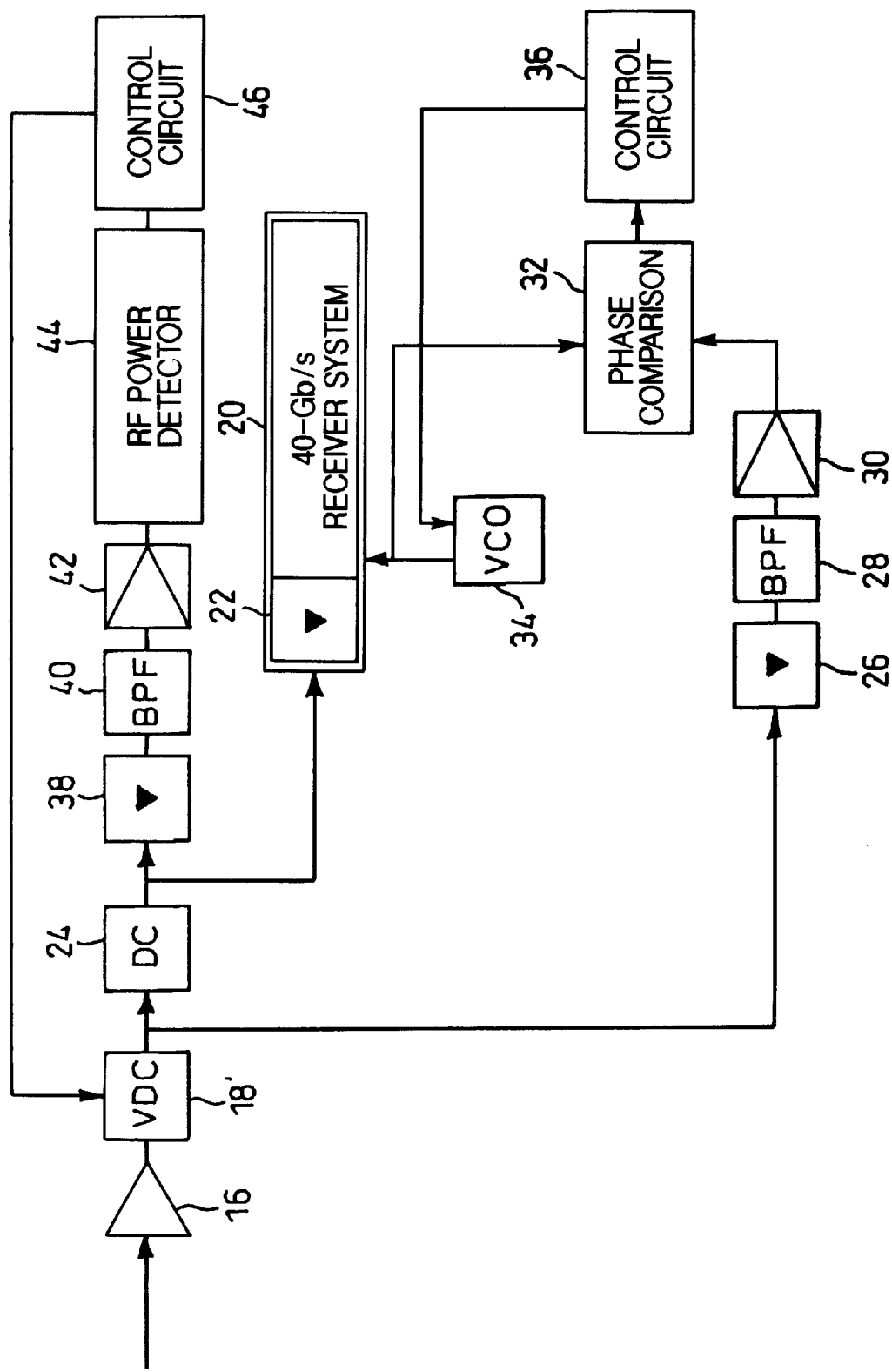
FIG. 16 is a block diagram showing a first modification to the optical transmission system shown in FIG. 11.

FIG. 16 shows a first modification to the system shown in FIG. 11. In FIG. 16, the variable dispersion compensator 18' is controlled so that the amount of total dispersion is reduced to zero when the compensation amount of the variable dispersion compensator 18' is combined with that of the dispersion compensator 24. When the dispersion compensator 24 is chosen to have a dispersion value of +60 ps/nm or −60 ps/nm, then the chromatic dispersion of the signal light entering the photodiode 26 is −60 ps/nm or +60 ps/nm, respectively, to maximize the 40-GHz component.

Figure 17:
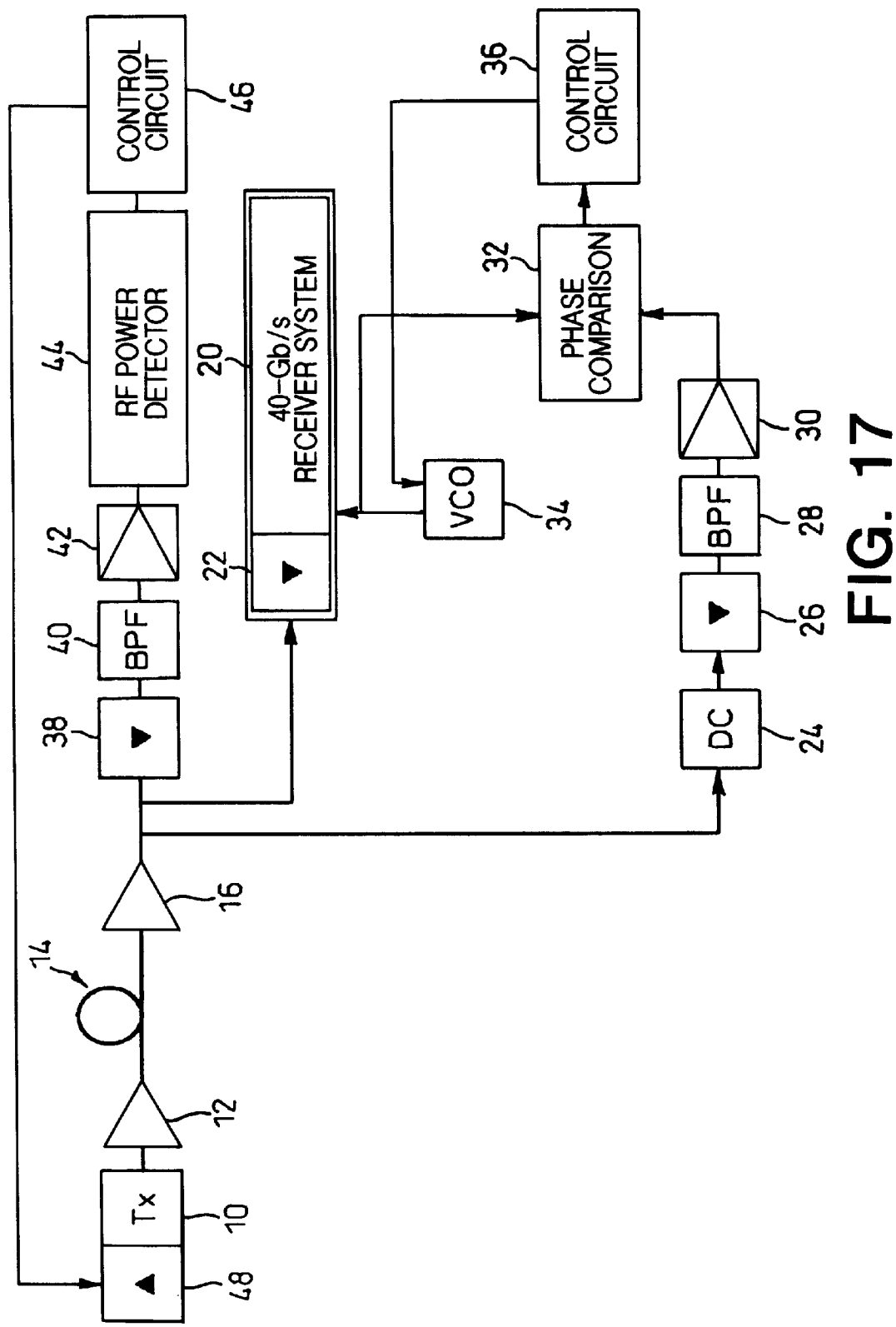
FIG. 17 is a block diagram showing a second modification to the optical transmission system shown in FIG. 11.
Figure 18:
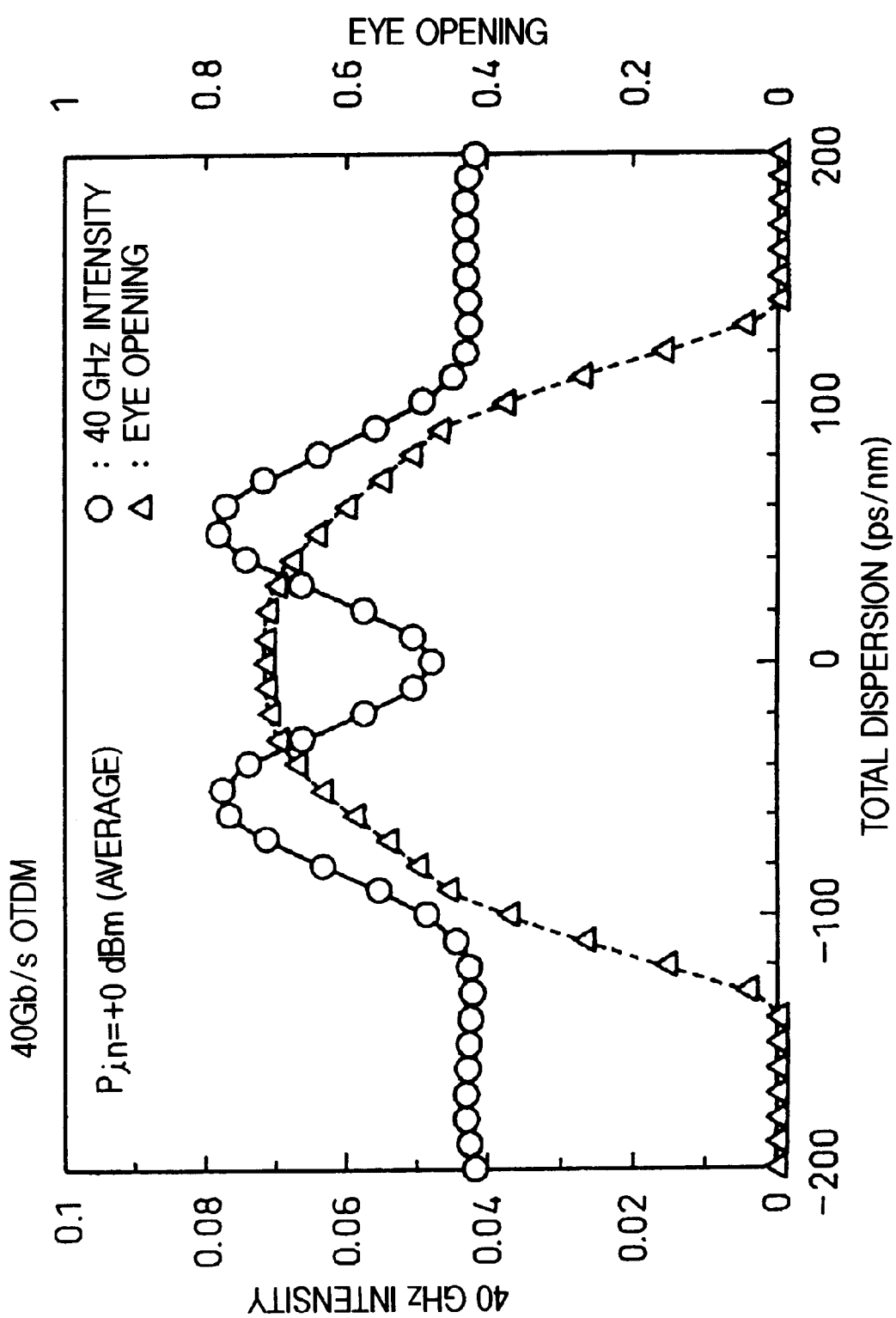
FIG. 18 is a graph showing a computer simulation of the dependence of the intensity of a 40-GHz clock component on the amount of total dispersion in the 40-GHz OTDM signal when signal light power is 0 dBm.
Figure 19:
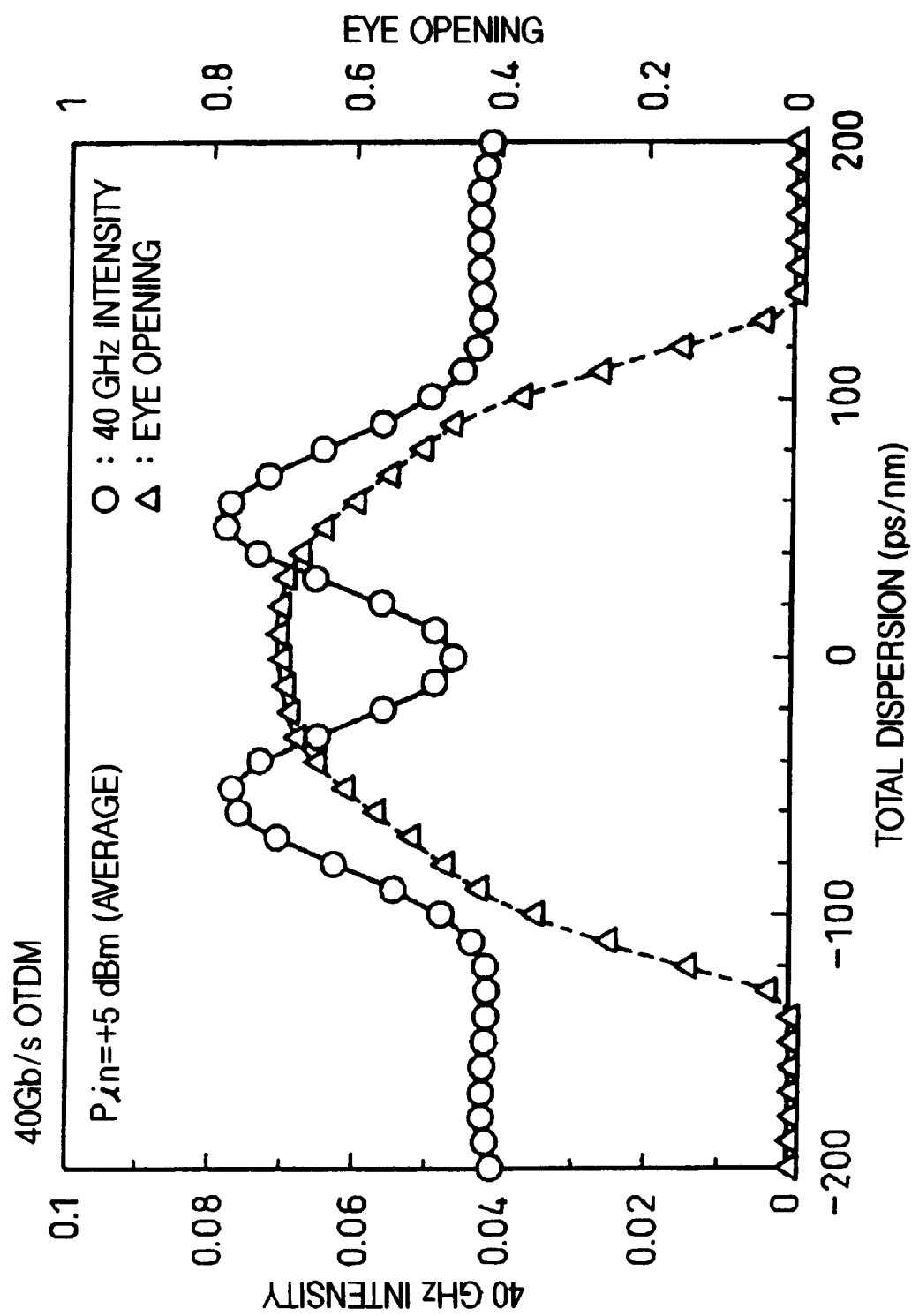
FIG. 19 is a graph showing a computer simulation of the dependence of the intensity of a 40-GHz clock component on the amount of total dispersion in the 40-GHz OTDM signal when signal light power is +5 dBm.
Figure 20:
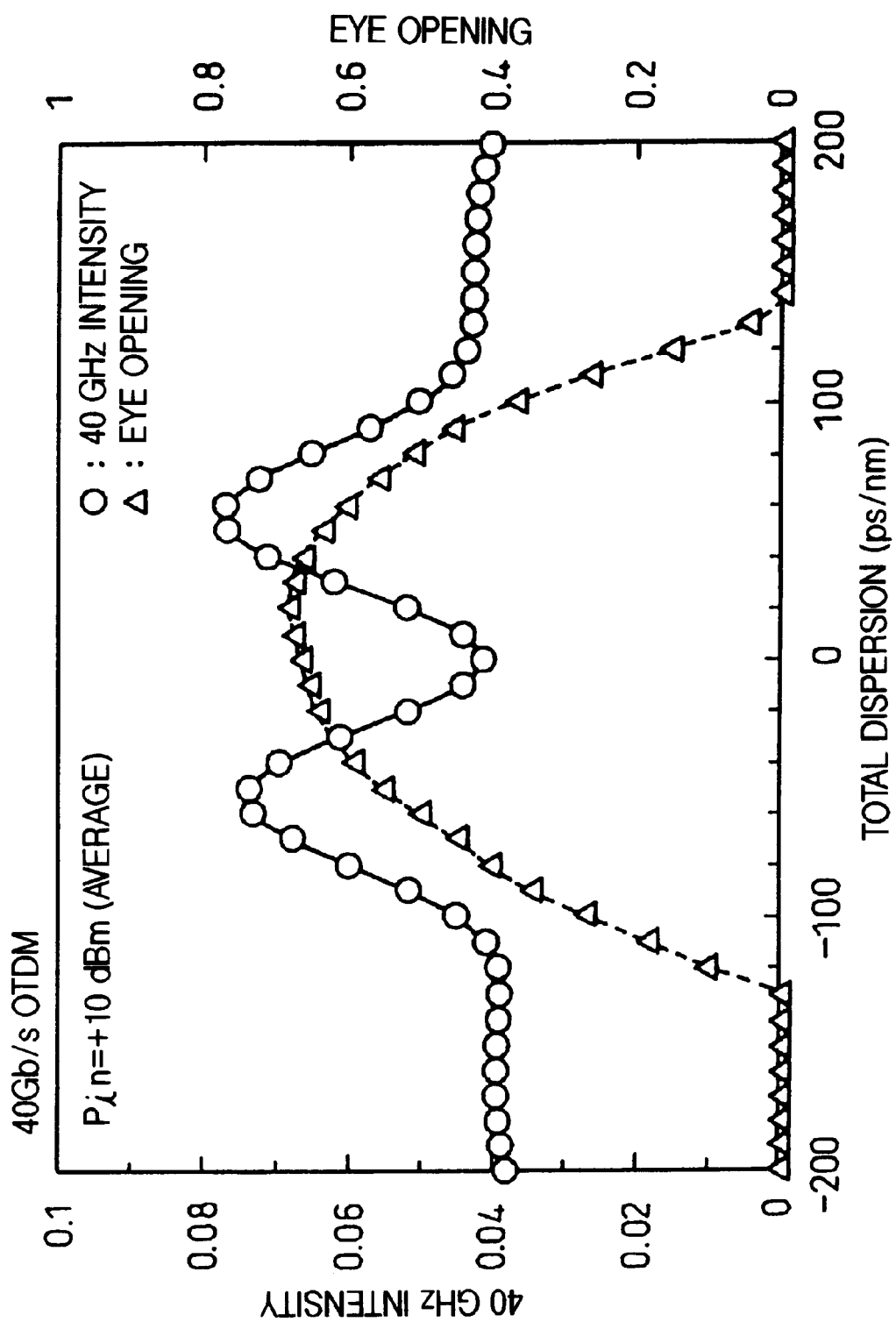
FIG. 20 is a graph showing a computer simulation of the dependence of the intensity of a 40-GHz clock component on the amount of total dispersion in the 40-GHz OTDM signal when signal light power is +10 dBm.
Figure 21:
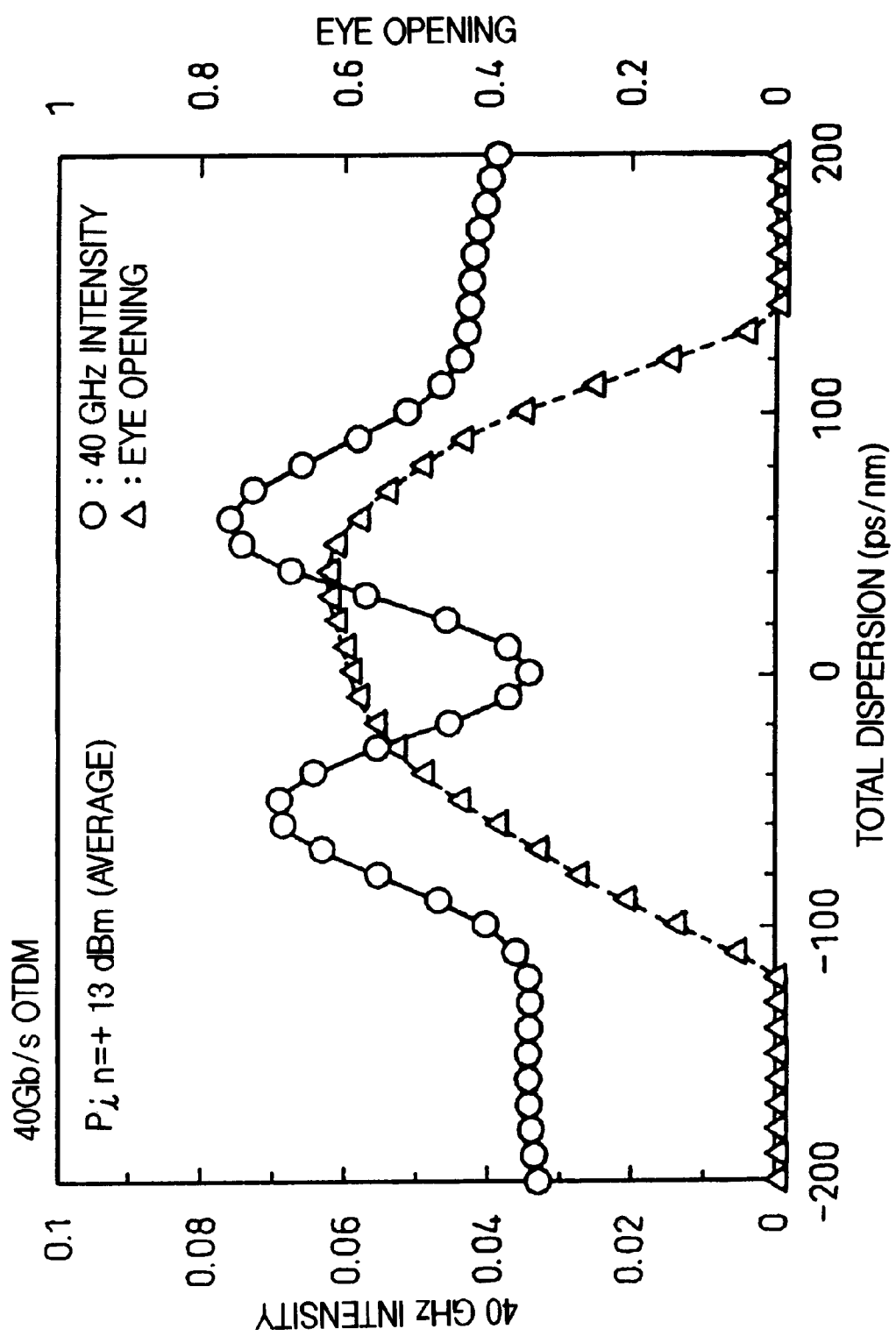
FIG. 21 is a graph showing a computer simulation of the dependence of the intensity of a 40-GHz clock component on the amount of total dispersion in the 40-GHz OTDM signal when signal light power is +13 dBm.

FIG. 17 shows a second modification to the system shown in FIG. 11. In the system shown in FIG. 17, instead of using the variable dispersion compensator 18' and controlling its dispersion amount to reduce the amount of total dispersion to zero, a variable wavelength light source 48 is used in the optical transmitter 10. The wavelength of the signal light is controlled in such a manner so as to minimize the intensity of the extracted 40-GHz component, thereby making the wavelength of the signal light substantially equal to the zero dispersion wavelength of the optical fiber 14 and thus reducing the amount of total dispersion to zero. In this case, the wavelength dependence of the dispersion amount (dispersion slope) of the dispersion compensator 24 must be considered. It is also possible to configure the system such that the dispersion amount is controlled at a constant value against the changing signal light wavelength.

Each of the above examples has assumed a 40-Gb/s NRZ (or OTDM) system in which the amount of total dispersion is zero and the eye opening is the largest when the intensity of the 40-GHz component is at a minimum. However, this assumption holds true only when the transmitting optical power is small enough that the influence of a non-linear effect (self-phase modulation: SPM) can be ignored.

FIGS. 18 to 21 show (as simulation results) the relationship between the intensity of a 40-GHz component and the eye opening plotted against the amount of total dispersion (after dispersion compensation) when the transmitting optical power is 0, +5, +10, and +13 dBm, respectively, in a 50-km single mode fiber (SMF) transmission line of a 40-Gb/s OTDM signal. As can be seen from FIG. 1 and FIGS. 18 to 21, the intensity and eye opening peaks are at the same total dispersion only at low transmitting powers. That is, the amount of total dispersion at which the intensity of the 40-GHz component is at a minimum coincides with the amount of total dispersion at which the eye opening is the largest only in the case of a linear transmission with a small signal light power (−5 dBm). As the signal light power increases, the nonlinear effect becomes larger and the peaks separate such that displacement between the two increases.

Figure 22:
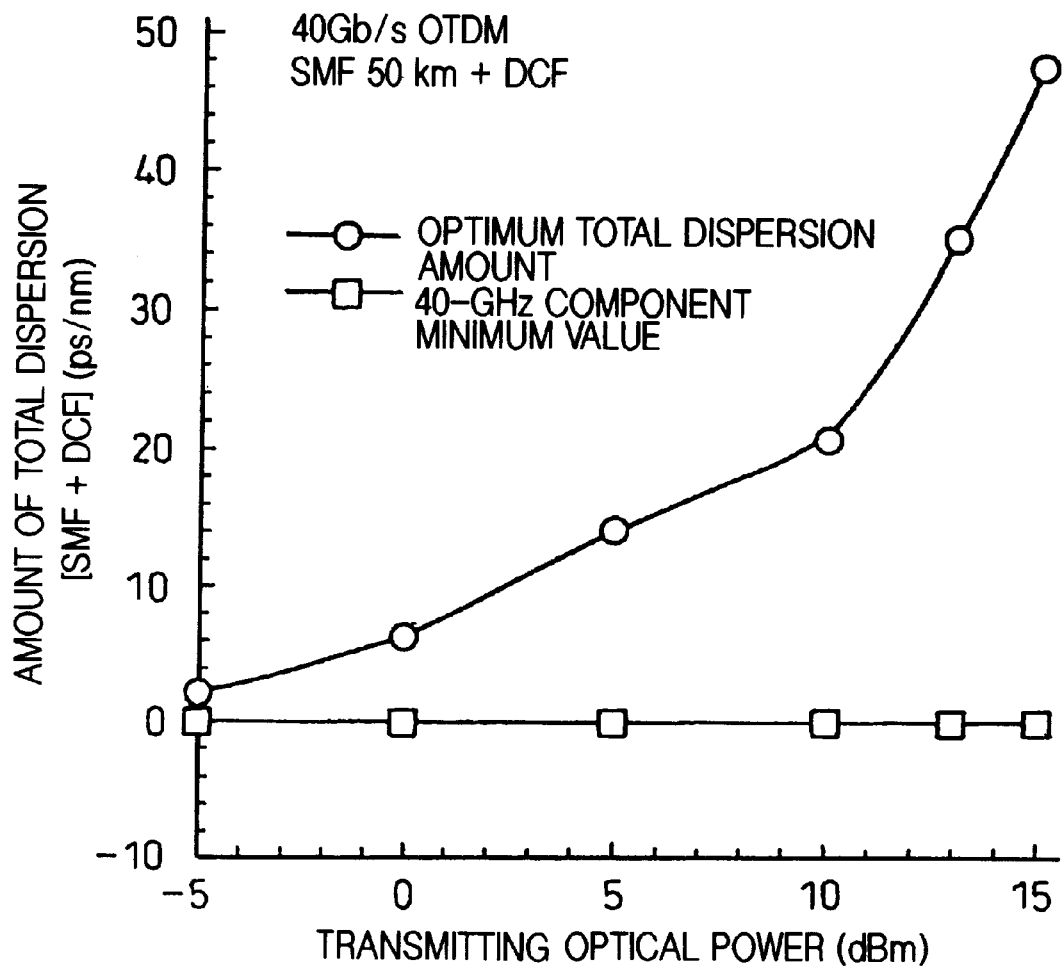
FIG. 22 is a graph showing the dependence on signal light power of (a) the optimum amount of total dispersion and (b) the amount of total dispersion at which the 40-GHz component is at a minimum, in the transmission of the 40-GHz OTDM signal.
Figure 23:
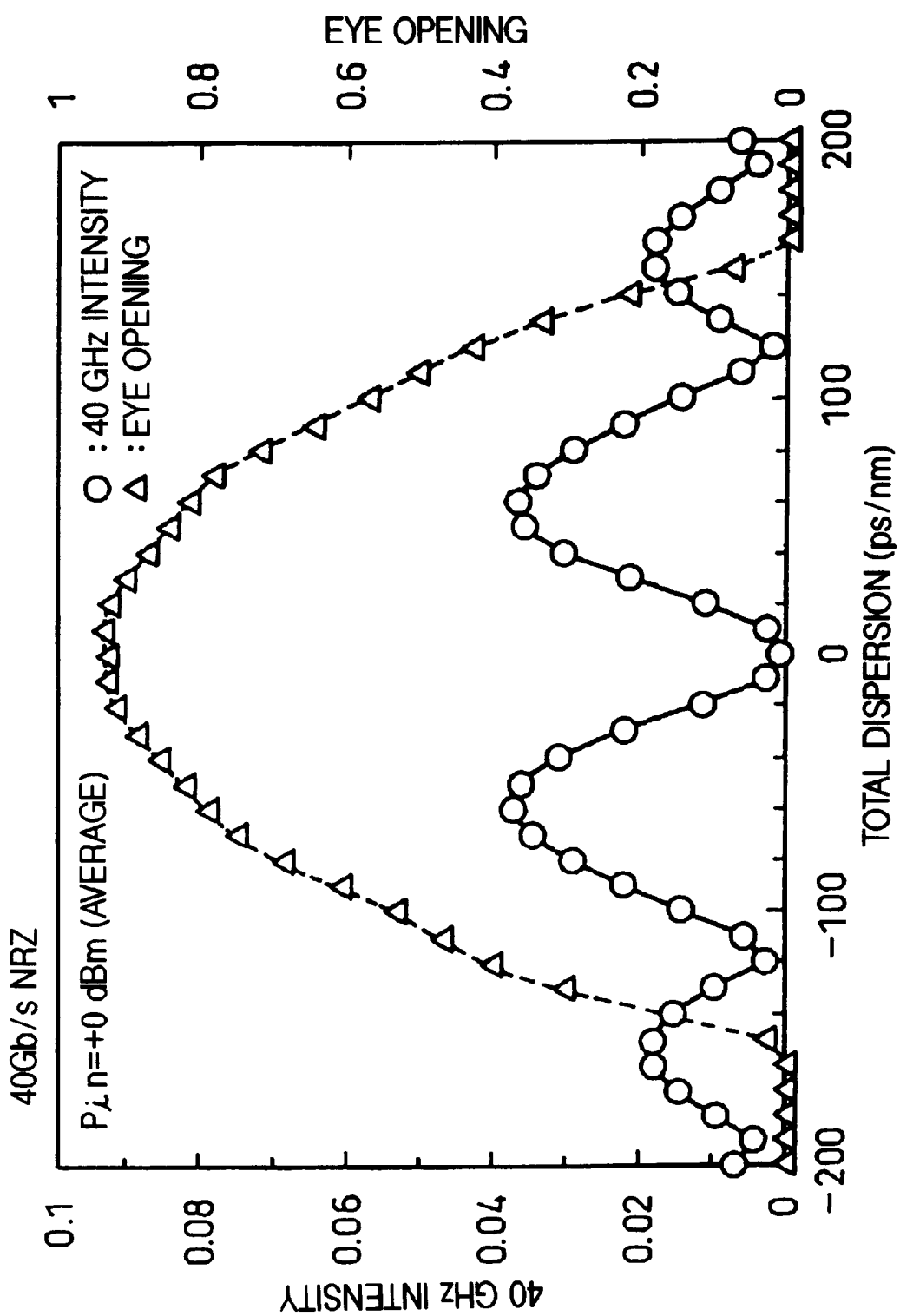
FIG. 23 is a graph showing a computer simulation of the dependence of the intensity of a 40-GHz clock component on the amount of total dispersion for a 40-GHz NRZ signal when signal light power is 0 dBm.
Figure 24:
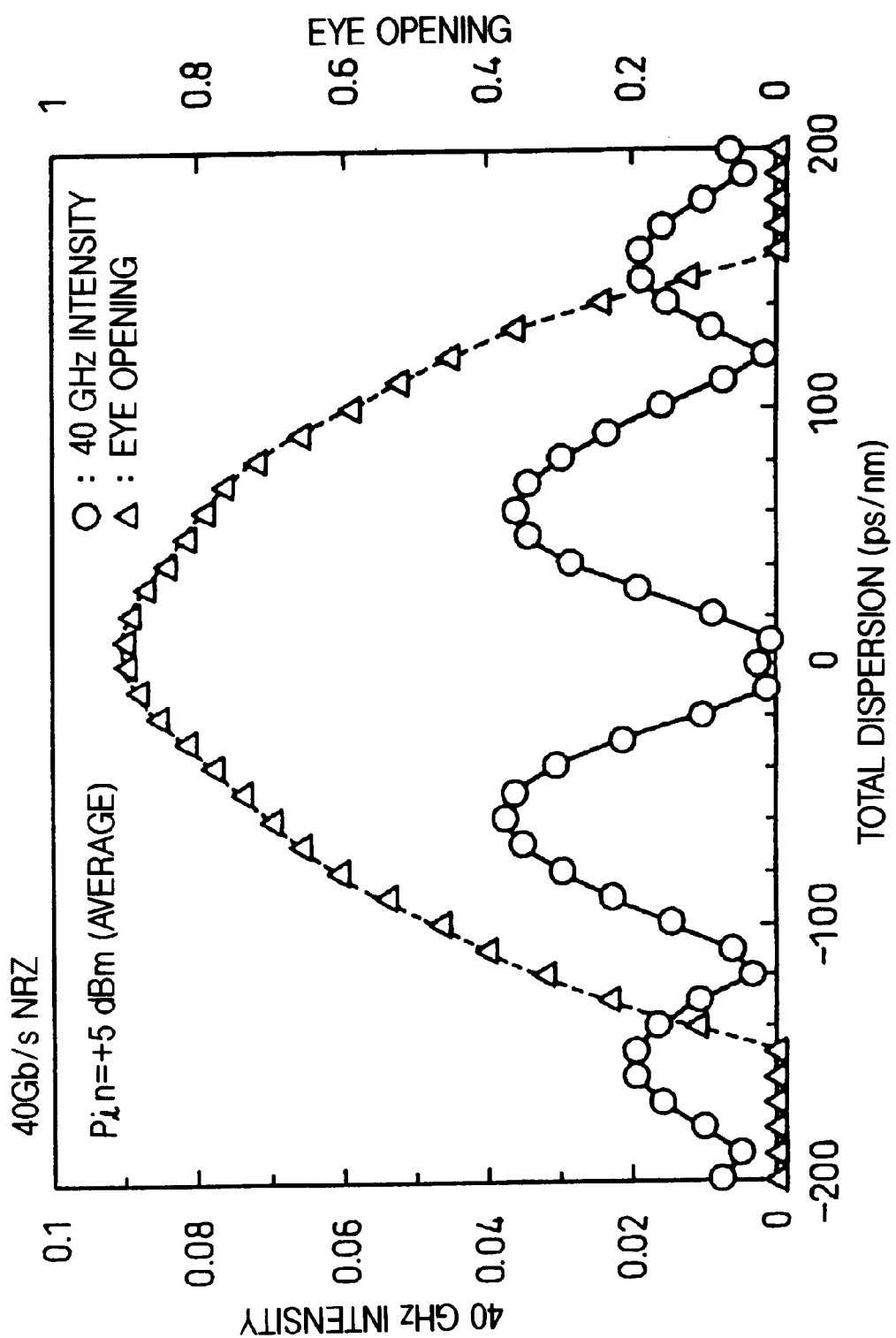
FIG. 24 is a graph showing a computer simulation of the dependence of the intensity of a 40-GHz clock component on the amount of total dispersion for a 40-GHz NRZ signal when signal light power is +5 dBm.
Figure 25:
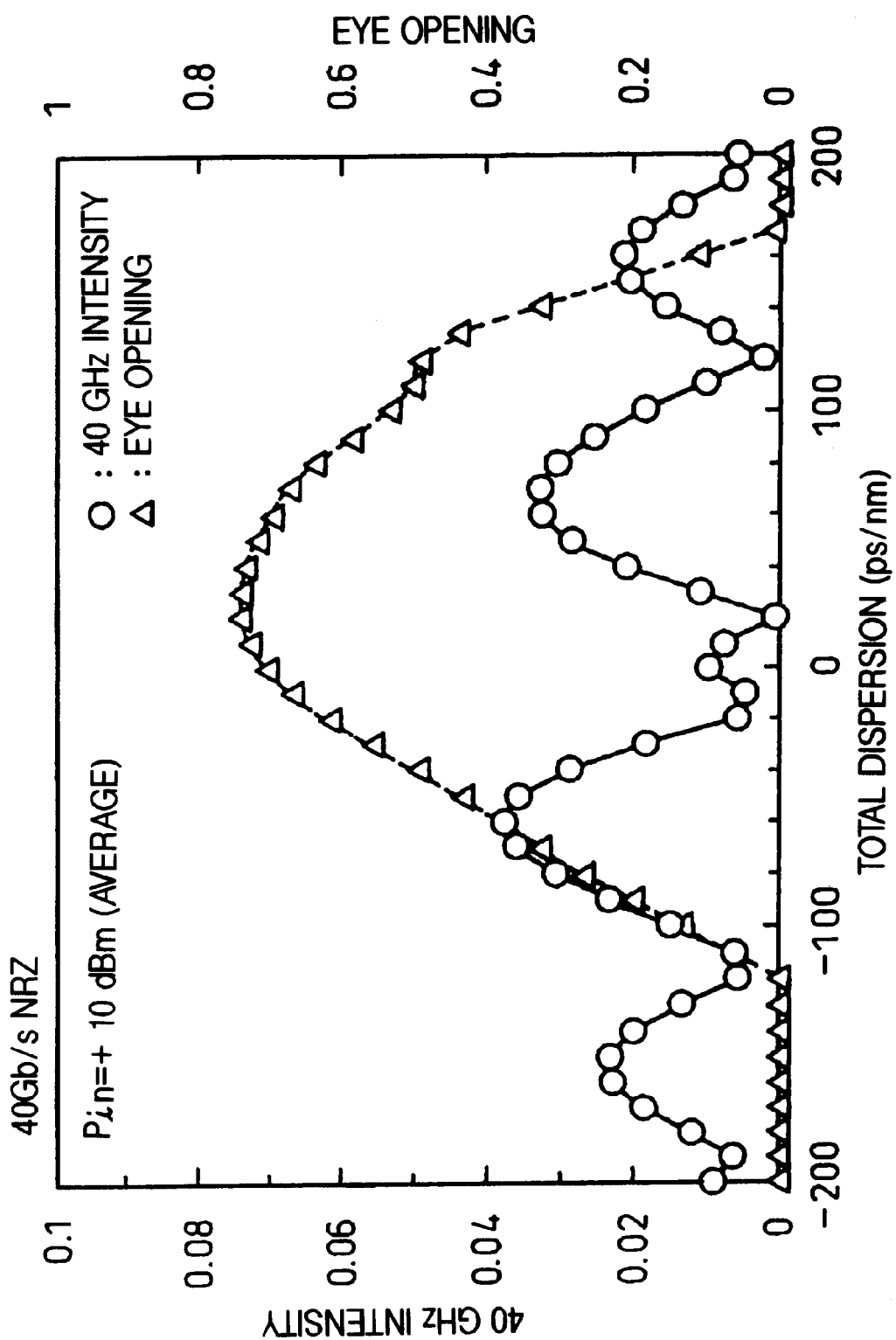
FIG. 25 is a graph showing a computer simulation of the dependence of the intensity of a 40-GHz clock component on the amount of total dispersion for a 40-GHz NRZ signal when signal light power is +10 dBm.
Figure 26:
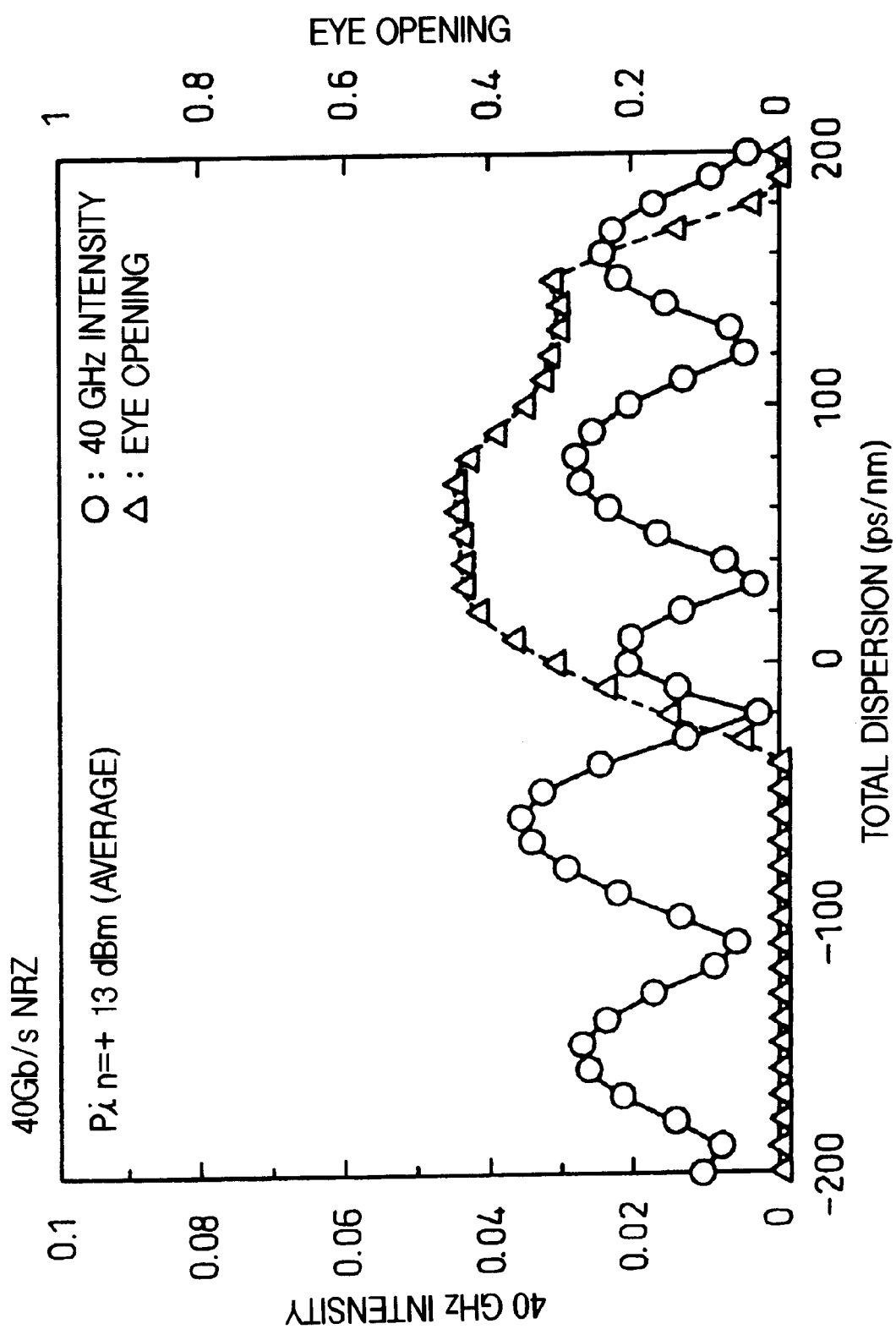
FIG. 26 is a graph showing a computer simulation of the dependence of the intensity of a 40-GHz clock component on the amount of total dispersion for a 40-GHz NRZ signal when signal light power is +13 dBm.

FIG. 22 is a graph illustrating the amount of total dispersion at which the eye opening is the largest and the amount of total dispersion at which the 40-GHz component is at a minimum, as a function of the transmitting optical power in the 50 km SMF transmission of the 40-Gb/s OTDM signal. As shown in FIG. 22, the amount of total dispersion at which the 40-GHz component is at a minimum is not dependent on the transmitting optical power, but is kept constant at 0 ps/nm, whereas the amount of total dispersion at which the eye opening is the largest increases as the transmitting optical power increases.

For an OTDM signal, if the total dispersion is minimized to zero via a control circuit to minimize the intensity of the 40-GHz component, the eye opening can be maximized by adding an amount of chromatic dispersion determined based on the transmitting optical power. On the other hand, the 40-GHz component can be maximized by adding a prescribed fixed amount of dispersion compensation to the optical signal whose chromatic dispersion has been reduced to zero.

FIGS. 23 to 26 are graphs illustrating simulation results, for an NRZ signal. FIGS. 23 to 26 show the relationship between the intensity of the 40-GHz component and the eye opening plotted against the amount of total dispersion (after dispersion compensation) when the transmitting optical power is 0, +5, +10, and +13 dBm, respectively, in a 50 km SMF transmission line. As can be seen from FIG. 2 and FIGS. 23 to 26, the amount of total dispersion at which the eye opening is the largest increases as the transmitting optical power increases. This characteristic is the same as that for the OTDM signal.

However, the way that the intensity of the 40-GHz component changes relative to the amount of total dispersion is different from the case of the OTDM signal. More specifically, in the OTDM signal, the 40-GHz component is always at a minimum when the amount of total dispersion is zero, regardless of the transmitting optical power. On the other hand, for the NRZ signal, the 40-GHz component is at a minimum (=0) when the amount of total dispersion is zero in the case of a linear transmission. However, when the transmitting optical power increases, the minimum intensity point for the 40-GHz occurs at greater total dispersion amounts. As a result, unlike the case of the OTDM signal, variable dispersion compensator 18' cannot be controlled in such a manner as to bring the 40-GHz component to a minimum at zero total dispersion. However, in the case of the 40-Gb/s NRZ signal, since maxima are reached at +60 ps/nm and −60 ps/nm regardless of the transmitting power, variable dispersion compensator 18' can be controlled to bring the amount of total dispersion to zero by determining the midpoint between the two maxima.

Figure 27:
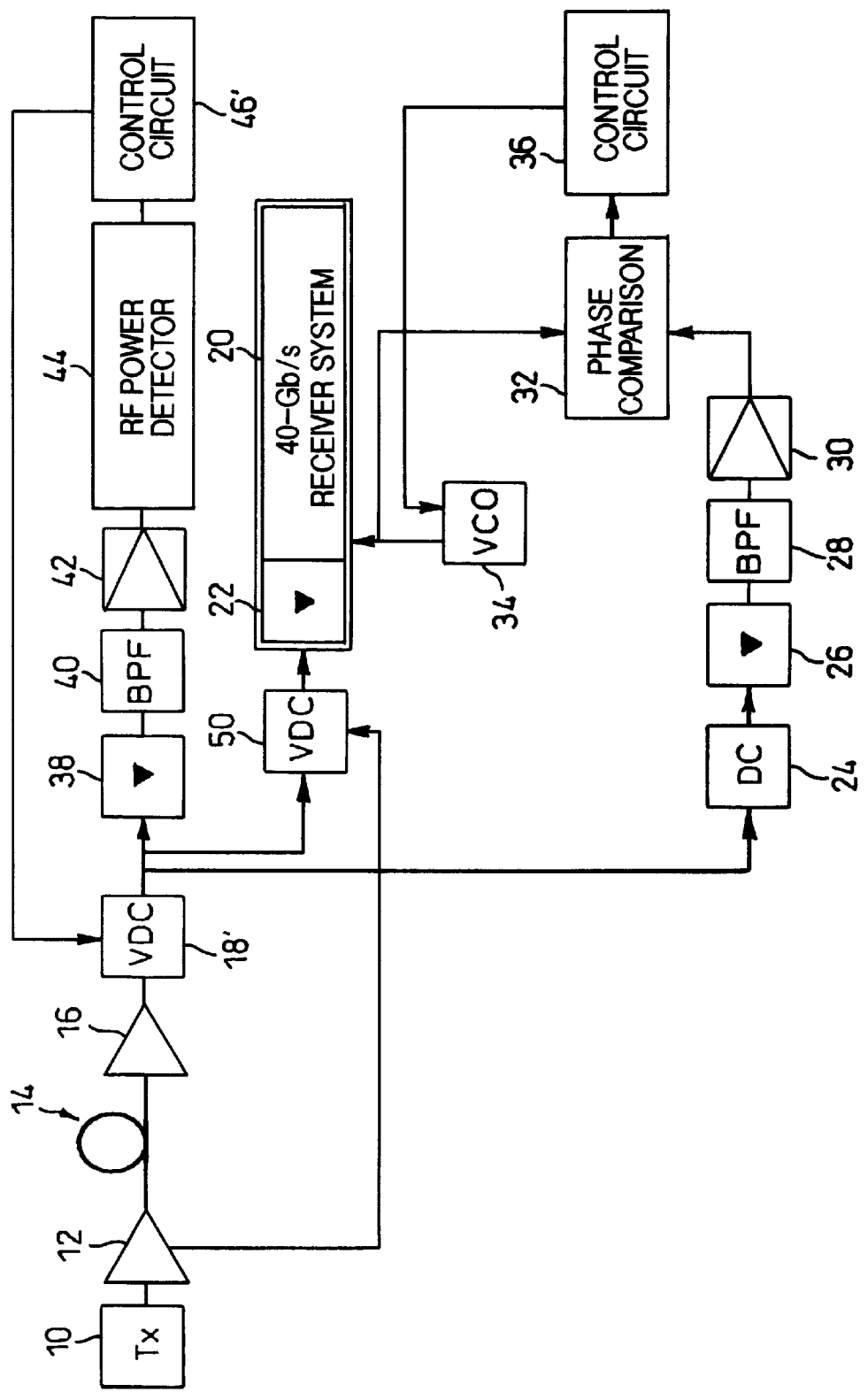
FIG. 27 is a block diagram of an optical transmission system according to a fourth preferred embodiment of the present invention.

FIG. 27 shows a fourth preferred embodiment of the present invention. Using the above-described technique, this embodiment is applicable for cases where the nonlinear effect cannot be ignored. In the case of an OTDM signal, a control circuit 46', like the control circuit of FIG. 11, controls the chromatic dispersion of the optical signal to zero at the output of the variable dispersion compensator 18'. This minimizes the intensity of the detected 40-GHz component. In the case of an NRZ signal, the control circuit 46' sweeps the intensity of the 40-GHz component to determine the dispersion amounts for the two intensity peaks. The amount of dispersion compensation in the variable dispersion compensator 18' is set to have the dispersion compensation amount at the midpoint between the two maximum points. This minimizes the intensity of the 40-GHz frequency component at the output of the dispersion compensator 18' regardless of the transmitting optical power.

A variable dispersion compensator VDC 50 maximizes the eye opening by adding an amount of chromatic dispersion determined according to the transmitting optical power. VDC 50 adds chromatic dispersion to the optical signal whose chromatic dispersion has been controlled to minimize the 40-GHz frequency component. The output of VDC 50 is supplied to the 40-Gb/s receiver system 20.

Detection of the transmitting optical power can be achieved by separating a portion of the light output by the optical post-amplifier 12 and detecting its optical power using a photodiode. Alternatively, the transmitting optical power can be determined from power information supplied by the optical post-amplifier 12. In FIG. 27, the information concerning the optical output power is sent from the transmitting end (from post-amplifier 12), but as an alternative method, the optical power may be detected at the receiving end, or a monitor signal within the optical preamplifier 16 may be used.

The system of FIG. 27 is constructed by modifying the system of FIG. 11 taking into consideration the nonlinear effect. It will be recognized that similar modifications can also be made to the systems of FIGS. 16 and 17.

In the total dispersion amount (after dispersion compensation) versus 40-GHz component relationship in the 50-km SMF transmission of the 40-Gb/s NRZ signal (FIG. 2), the 40-GHz component becomes zero at periodic intervals. When sweeping the dispersion value of the variable dispersion compensator over a wide range during the process of setting an optimum value for variable dispersion compensation (for example, at system startup) there is a possibility that synchronization of the clock signal may be momentarily lost, causing a failure in system operation. There is also a possibility (danger) that the setting of the variable dispersion compensator happens to coincide with a clock component zero state, leading to an erroneous decision that a failure has occurred since no clocks are generated. In system operation, optimization of dispersion compensation should be performed first, and after that, timing extraction should be initiated, to avoid such trouble. In the case of the RZ signals also (FIGS. 3 and 4), a similar sequence is necessary since the clock component becomes zero at periodic intervals.

According to the present invention, in an ultra high-speed optical transmission system, a receiver system can monitor and optimize the amount of chromatic dispersion using a variable dispersion compensator. This can be done while allowing the use of the PLL method for timing extraction even in the case of an NRZ signal.

While the invention has been described in connection with the preferred embodiments, it will be understood that modifications within the principle outlined above will be evident to those skilled in the art. Thus, the invention is not limited to the preferred embodiments, but is intended to encompass such modifications.

What is claimed is:

1. A timing signal extracting device comprising:
    a signal reproduction circuit to produce a data signal from a first portion of an optical signal;
    a signal extraction circuit to extract a timing signal from a second portion of the optical signal the timing signal being supplied to the signal reproduction circuit; and
    a chromatic dispersion control apparatus to add dispersion compensation to at least one of the first and second portions of the optical signal to thereby control the amount of total dispersion in the second portion of the optical signal to be substantially different from the amount of total dispersion in the first portion of the optical signal.

2. A timing signal extracting device according to claim 1, wherein the chromatic dispersion control apparatus minimizes total dispersion in at least one of the first and second portions of the optical signal.

3. A timing signal extracting device according to claim 1, wherein the chromatic dispersion control apparatus includes a first dispersion compensator for minimizing dispersion in the first and second portions of the optical signal and a second dispersion compensator for increasing the dispersion from the minimum total dispersion, in only the second portion of the optical signals.

4. A timing signal extracting device according to claim 1, wherein
    the optical signal is modulated by a data signal having a bit rate in units of bits/second,
    the extracted timing signal has a frequency in units of hertz, and
    the values of the bit rate and the frequency are numerically equal.

5. A timing signal extracting device according to claim 1, wherein the signal extraction circuit includes a phase locked loop.

6. A timing signal extracting device according to claim 1, further comprising:
    a voltage-controlled oscillator to generate a clock signal;
    a phase comparison circuit for comparing the phase of the clock signal with the phase of the extracted timing signal; and a control circuit connected to the phase comparison circuit, to generate a control voltage for said voltage-controlled oscillator on the basis of the comparison from the phase comparison circuit.

7. A timing signal extracting device according to claim 1, wherein the chromatic dispersion control apparatus includes a variable dispersion compensator for adding dispersion compensation according to optical signal power to said first optical signal before said first optical signal is supplied to said signal reproduction circuit.

8. A timing signal extracting device according to claim 7, further comprising a preamplifier to amplify the optical signal and transmit the optical signal on a transmission line, the variable dispersion compensator adding dispersion compensation according to amplification power of the preamplifier.

9. A timing signal extracting device according to claim 1, wherein the optical signal is non-return-to-zero signal or an optical time division multiplexed signal.

10. A timing signal extracting device according to claim 1, wherein the chromatic dispersion control apparatus includes:
a variable dispersion compensator; and
a control circuit to control the variable dispersion compensator to minimize total dispersion at a point downstream from the variable dispersion compensator.

11. A timing signal extracting device according to claim 1, wherein the chromatic dispersion control apparatus includes:
an optical detector for detecting the intensity of a specific frequency component of the optical signal, the optical signal having an intensity v. total dispersion characteristic curve with at least two peaks; and
a variable dispersion compensator to control the amount of total dispersion in the optical signal to substantially minimize the intensity of the specific frequency component between the two highest peaks of the intensity v. total dispersion characteristic curve of the optical signal.

12. A timing signal extracting device according to claim 11, further comprising:
a voltage-controlled oscillator to generate a clock signal;
a phase comparison circuit for comparing the phase of the clock signal with the phase of the extracted timing signal; and
a control circuit connected to the phase comparison circuit, to generate a control voltage for said voltage-controlled oscillator on the basis of the comparison from the phase comparison circuit.

13. A timing signal extracting device according to claim 11, wherein the optical signal is modulated by a data signal having a bit rate of X bits/second, and the specific frequency component and the extracted timing signal have a frequency of X hertz.

14. A timing signal extraction device according to claim 11, wherein the optical detector is downstream from the variable dispersion compensator.

15. A timing signal extraction device according to claim 11, wherein the variable dispersion compensator controls the amount of dispersion for both the first and second portions of the optical signal.

16. A timing signal extracting device according to claim 11, wherein the variable dispersion compensator includes a plurality of piezoelectric segments arranged end-to-end adjacent to a chirped fiber grating, voltages being separately applied to each of the segments.

17. A timing signal extracting device according to claim 11, wherein the chromatic dispersion control apparatus further includes a control circuit connected to the optical detector and the variable dispersion compensator, the control circuit comprising:
a memory to store a last intensity value and the intensity v. total dispersion characteristic curve;
a processor to receive a current intensity value from the optical detector, compare the current intensity value with the last intensity value, determine where on the characteristic curve the current intensity falls based on the comparison, and increase or decrease dispersion compensation based on the comparison if the intensity of the specific frequency component is not minimized.

18. A timing signal extracting device according to claim 11, wherein
the variable dispersion compensator controls the amount of dispersion for both the first and second portions of the optical signal,
the first portion of the optical signal is separated from the second portion of the optical signal at a separation point, and
the chromatic dispersion control apparatus further includes a fixed dispersion compensator downstream from the variable dispersion compensator and the separation point to add dispersion compensation to only the second portion of the optical signal.

19. A timing signal extracting device according to claim 18, wherein the chromatic dispersion control apparatus further includes a second variable dispersion compensator for adding dispersion compensation according to optical signal power, to said portion of the first optical signal before said first portion of the optical signal is supplied to said signal reproduction circuit.

20. A timing signal extracting device according to claim 11, wherein the chromatic dispersion control apparatus further includes a second variable dispersion compensator for adding dispersion compensation according to optical signal power, to said first portion of the optical signal before said first portion of the optical signal is supplied to said signal reproduction circuit.

21. A timing signal extracting device according to claim 1, wherein the chromatic dispersion control apparatus includes:
a variable dispersion compensator;
a fixed dispersion compensator connected in series with the variable dispersion compensator; and
a control circuit to control the variable dispersion compensator to minimize total dispersion at a point downstream from both the variable dispersion compensator and the fixed dispersion compensator.

22. A timing signal extracting device according to claim 1, wherein the chromatic dispersion control apparatus includes:
an optical detector for detecting the intensity of a specific frequency component of the optical signal, the optical signal having an intensity v. total dispersion characteristic curve with at least two peaks;
a fixed dispersion compensator; and
a variable dispersion compensator connected in series with the fixed dispersion compensator to control the amount of total dispersion in the optical signal at a point downstream from the fixed dispersion compensator and the variable dispersion compensator to substantially minimize the intensity of the specific frequency component between the two highest peaks of the intensity v. total dispersion characteristic curve of the optical signal.

23. A timing signal extracting device according to claim 22, wherein the first portion of the optical signal is separated from the second portion of the optical signal at a separation point between the fixed and variable dispersion compensators, such that the signal reproduction circuit is downstream from the fixed dispersion compensator.

24. A timing signal extracting device according to claim 22, wherein the chromatic dispersion control apparatus includes a second variable dispersion compensator for adding dispersion compensation according to optical signal power to said first optical signal before said first optical signal is supplied to said signal reproduction circuit.

25. A timing signal extracting device according to claim 1, wherein the chromatic dispersion control apparatus includes:
   a variable wavelength light source; and
   a control circuit to control the wavelength of variable wavelength light source to minimize total dispersion at a point downstream from the variable wavelength light source.

26. A timing signal extracting device according to claim 1, wherein the chromatic dispersion control apparatus includes:
   an optical detector for detecting the intensity of a specific frequency component of the optical signal, the optical signal having an intensity v. total dispersion characteristic curve with at least two peaks; and
   a variable wavelength light source to control the amount of total dispersion in the optical signal to substantially minimize the intensity of the specific frequency component between the two highest peaks of the intensity v. total dispersion characteristic curve of the optical signal.

27. A timing signal extracting device according to claim 26, further comprising:
   a voltage-controlled oscillator to generate a clock signal;
   a phase comparison circuit for comparing the phase of the clock signal with the phase of the extracted timing signal; and
   a control circuit connected to the phase comparison circuit, to generate a control voltage for said voltage-controlled oscillator on the basis of the comparison from the phase comparison circuit.

28. A timing signal extracting device according to claim 26, wherein
   the optical signal is modulated by a data signal having a bit rate in units of bits/second,
   the specific frequency component and the extracted timing signal have a frequency in units of hertz, and
   the values of the bit rate and the frequency of the specific frequency component and extracted timing signal are numerically equal.

29. A timing signal extracting device according to claim 26, wherein the chromatic dispersion control apparatus further includes a control circuit connected to the optical detector and the variable wavelength light source, the control circuit comprising:
   a memory to store a last intensity value and the intensity v. total dispersion characteristic curve;
   a processor to receive a current intensity value from the optical detector, compare the current intensity value with the last intensity value, determine where on the characteristic curve the current intensity falls based on the comparison, and change the wavelength of the variable wavelength light source based on the comparison if the intensity of the specific frequency component is not minimized.

30. A timing signal extracting device according to claim 26, wherein
   the first portion of the optical signal is separated from the second portion of the optical signal at a separation point, and
   the chromatic dispersion control apparatus further includes a dispersion compensator downstream from the separation point to add dispersion compensation to only the second portion of the optical signal.

31. A timing signal extracting device according to claim 30, wherein the chromatic dispersion control apparatus further includes a variable dispersion compensator for adding dispersion compensation according to optical signal power, to said portion of the first optical signal before said first portion of the optical signal is supplied to said signal reproduction circuit.

32. A timing signal extracting device according to claim 26, wherein the chromatic dispersion control apparatus further includes a variable dispersion compensator for adding dispersion compensation according to optical signal power, to said portion of the first optical signal before said first portion of the optical signal is supplied to said signal reproduction circuit.

33. A timing signal extracting device according to claim 1, wherein the chromatic dispersion control apparatus includes:
   a variable wavelength light source;
   a dispersion compensator; and
   a control circuit to control the variable wavelength light source to minimize total dispersion at a point downstream from the dispersion compensator.

34. A timing signal extracting device according to claim 1, wherein the chromatic dispersion control apparatus includes:
   an optical detector for detecting the intensity of a specific frequency component of the optical signal, the optical signal having an intensity v. total dispersion characteristic curve with at least two peaks;
   a dispersion compensator; and
   a variable wavelength light source to produce the optical signal and to control the amount of total dispersion in the optical signal by varying the wavelength of the optical signal, the variable wavelength light source controlling the amount of total dispersion to substantially minimize the intensity of the specific frequency component between the two highest peaks of the intensity v. total dispersion characteristic curve of the optical signal, the intensity being minimized at a point downstream from the dispersion compensator.

35. A timing signal extracting device according to claim 34, wherein the first portion of the optical signal is separated from the second portion of the optical signal at a separation point between the variable wavelength light source and the dispersion compensator, such that the signal reproduction circuit is downstream from the dispersion compensator.

36. A timing signal extracting device according to claim 34, wherein the chromatic dispersion control apparatus includes a variable dispersion compensator for adding dispersion compensation according to optical signal power to said first optical signal before said first optical signal is supplied to said signal reproduction circuit.

37. A method for extracting a timing signal, comprising the steps of:
   (a) producing a data signal from a first portion of an optical signal;
   (b) extracting a timing signal from a second portion of the optical signal; and
   (c) adding dispersion compensation to at least one of the first and second portions of the optical signal to thereby control the amount of total dispersion in the second portion of the optical signal to be substantially different from the amount of total dispersion in the first portion of the optical signal.

38. A method for extracting a timing signal according to claim 37, wherein
   the optical signal is modulated by a data signal having a bit rate in units of bits/second,
   the extracted timing signal has a frequency in units of hertz, and
   the values of the bit rate and the frequency are numerically equal.

39. A method for extracting a timing signal according to claim 37, further comprising the steps of:
   (d) generating a clock signal with a voltage-controlled oscillator;
   (e) comparing the phase of the clock signal with the phase of the extracted timing signal; and
   (f) generating a control voltage for said voltage-controlled oscillator on the basis of the comparison in step (e).

40. A method for extracting a timing signal according to claim 37, wherein step (c) includes the substeps of:
   detecting the intensity of a specific frequency component of the optical signal, the optical signal having an intensity v. total dispersion characteristic curve with at least two peaks, and
   varying the amount of dispersion in the optical signal to substantially minimize the intensity of the specific frequency component between the two highest peaks of the intensity v. total dispersion characteristic curve of the optical signal.

41. A method for extracting a timing signal according to claim 40, wherein the amount of dispersion is varied and the intensity is minimized for at least the first portion of the optical signal.

42. A method for extracting a timing signal according to claim 40, wherein
   the optical signal is modulated by a data signal having a bit rate in units of bits/second,
   the specific frequency component and the extracted timing signal have a frequency in units of hertz, and
   the values of the bit rate and the frequency of the specific frequency component and extracted timing signal are numerically equal.

43. A method for extracting a timing signal according to claim 37, wherein step (c) is performed at least before step (a).

44. A method for extracting a timing signal according to claim 40, wherein step (c) is performed at least before step (a).

45. A method for extracting a timing signal according to claim 40, wherein the amount of dispersion is varied using a plurality of piezoelectric segments arranged end-to-end adjacent to a chirped fiber grating, the amount of dispersion being varied by separately applying voltage to each of the segments such that the voltages change gradually from one segment to an adjacent segment, the rate of voltage change from one segment to an adjacent segment being varied to vary the amount of dispersion.

* * * * *

UNITED STATES PATENT AND TRADEMARK OFFICE
CERTIFICATE OF CORRECTION

PATENT NO. : 6,204,949 B1
DATED : March 20, 2001
INVENTOR(S) : Ishikawa et al.

It is certified that error appears in the above-identified patent and that said Letters Patent is hereby corrected as shown below:

Column 10,
Line 30, after "signal" (first occurrence), insert --,--.

Signed and Sealed this

Twenty-fifth Day of September, 2001

Attest:

*Nicholas P. Godici*

NICHOLAS P. GODICI
*Attesting Officer*    *Acting Director of the United States Patent and Trademark Office*